(12) United States Patent
Bozarth et al.

(10) Patent No.: US 9,232,353 B2
(45) Date of Patent: Jan. 5, 2016

(54) APPROACHES FOR DEVICE LOCATION AND COMMUNICATION

(71) Applicant: Amazon Technologies, Inc., Reno, NV (US)

(72) Inventors: Bradley J. Bozarth, Sunnyvale, CA (US); Kenneth M. Karakotsios, San Jose, CA (US); Gregory M. Hart, Mercer Island, WA (US); Ian W. Freed, Seattle, WA (US); Jeffrey P. Bezos, Greater Seattle Area, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 246 days.

(21) Appl. No.: 13/842,546

(22) Filed: Mar. 15, 2013

(65) Prior Publication Data

US 2014/0247346 A1    Sep. 4, 2014

Related U.S. Application Data

(63) Continuation of application No. 12/763,118, filed on Apr. 19, 2010, now Pat. No. 8,447,070.

(51) Int. Cl.
*G06K 9/00* (2006.01)
*H04W 4/02* (2009.01)
*H04M 1/725* (2006.01)
*H04W 8/00* (2009.01)
*H04N 7/18* (2006.01)

(52) U.S. Cl.
CPC ..... *H04W 4/023* (2013.01); *G06T 2207/10016* (2013.01); *H04M 1/7253* (2013.01); *H04M 1/72572* (2013.01); *H04N 7/18* (2013.01); *H04W 8/005* (2013.01)

(58) Field of Classification Search
None
See application file for complete search history.

(56) References Cited

U.S. PATENT DOCUMENTS

| 5,647,019 | A | 7/1997 | Lino et al. |
| 7,230,582 | B1 | 6/2007 | Dove et al. |
| 7,348,963 | B2 * | 3/2008 | Bell .............................. 345/156 |
| 7,626,569 | B2 * | 12/2009 | Lanier ........................... 345/156 |
| 8,004,555 | B2 * | 8/2011 | Oswald et al. ............. 348/14.01 |
| 8,558,893 | B1 * | 10/2013 | Persson et al. ................ 348/159 |

(Continued)

FOREIGN PATENT DOCUMENTS

| CN | 1609780 | 4/2005 |
| CN | 101006480 | 7/2007 |

(Continued)

OTHER PUBLICATIONS

Notice of Allowance for U.S. Appl. No. 12/763,118, mailed Feb. 5, 2013, 14 pages.

(Continued)

*Primary Examiner* — Shervin Nakhjavan
(74) *Attorney, Agent, or Firm* — Novak Druce Connolly Bove + Quigg LLP

(57) ABSTRACT

An electronic device can utilize image capture technology to detect the presence and location of another device. Using this information, the electronic device can display, in a user interface, a graphical element representing a detected device, along with identity information and the location of the detected device relative to the electronic device. The location of each detected device relative to the electronic device can be tracked and thus the graphical element can be updated in the user interface.

22 Claims, 14 Drawing Sheets

(56) References Cited

U.S. PATENT DOCUMENTS

| | | | |
|---|---|---|---|
| 8,723,789 B1* | 5/2014 | Rafii | 345/156 |
| 8,788,977 B2* | 7/2014 | Bezos | 715/863 |
| 2005/0054352 A1 | 3/2005 | Karaizman | |
| 2005/0165292 A1* | 7/2005 | Simon et al. | 600/407 |
| 2006/0241792 A1 | 10/2006 | Pretlove et al. | |
| 2006/0256959 A1 | 11/2006 | Hymes | |
| 2007/0198286 A1* | 8/2007 | Tomita | 705/1 |
| 2008/0002025 A1* | 1/2008 | Kakinami | 348/115 |
| 2008/0037050 A1 | 2/2008 | Sasaki | |
| 2008/0046150 A1* | 2/2008 | Breed | 701/45 |
| 2008/0051033 A1 | 2/2008 | Hymes | |
| 2008/0056536 A1* | 3/2008 | Hildreth et al. | 382/103 |
| 2008/0129825 A1* | 6/2008 | DeAngelis et al. | 348/169 |
| 2009/0116691 A1 | 5/2009 | Scholl | |
| 2009/0175499 A1 | 7/2009 | Rosenblatt | |
| 2010/0087144 A1* | 4/2010 | Korenshtein | 455/41.2 |
| 2010/0103075 A1* | 4/2010 | Kalaboukis et al. | 345/8 |
| 2010/0121920 A1* | 5/2010 | Horner et al. | 709/204 |
| 2010/0125816 A1* | 5/2010 | Bezos | 715/863 |
| 2010/0273452 A1* | 10/2010 | Rajann et al. | 455/411 |
| 2011/0170787 A1* | 7/2011 | Gum | 382/209 |
| 2014/0032635 A1* | 1/2014 | Pimmel et al. | 709/203 |

FOREIGN PATENT DOCUMENTS

| | | |
|---|---|---|
| JP | 09-271006 A | 10/1997 |
| JP | 2002-218503 A | 8/2002 |
| JP | 2003-174578 A | 6/2003 |
| JP | 2005-192098 A | 7/2005 |
| JP | 2005-250734 A | 11/2006 |
| JP | 2006-313475 A | 11/2006 |
| JP | 2007-233619 A | 9/2007 |
| JP | 2007525910 A | 9/2007 |

OTHER PUBLICATIONS

"International Search Report dated Jun. 22, 2011," International Application No. PCT/US11/33109, Jun. 22, 2011, 2 pages.

"International Preliminary Report on Patentability dated Nov. 1, 2012," International Application No. PCT/US11/33109, Nov. 1, 2012, 8 pages.

"Non-Final Office Action dated Oct. 2, 2012," U.S. Appl. No. 12/763,118, Oct. 3, 2012, 22 pages.

"Official Notice of Rejection dated Jan. 7, 2014," Japanese Application No. 2013-506247, Jan. 7, 2014, 8 pages. (including translation.).

Chinese Office Action and Search Report dated Nov. 2, 2014, for Chinese Patent Application No. 201180019679.3 filed Apr. 19, 2011, 13 pages.

Japanese Patent Office, Notice of Rejection mailed Aug. 14, 2014, for Japanese Patent Application No. 2013-506247 filed Oct. 18, 2012, 4 pages.

* cited by examiner

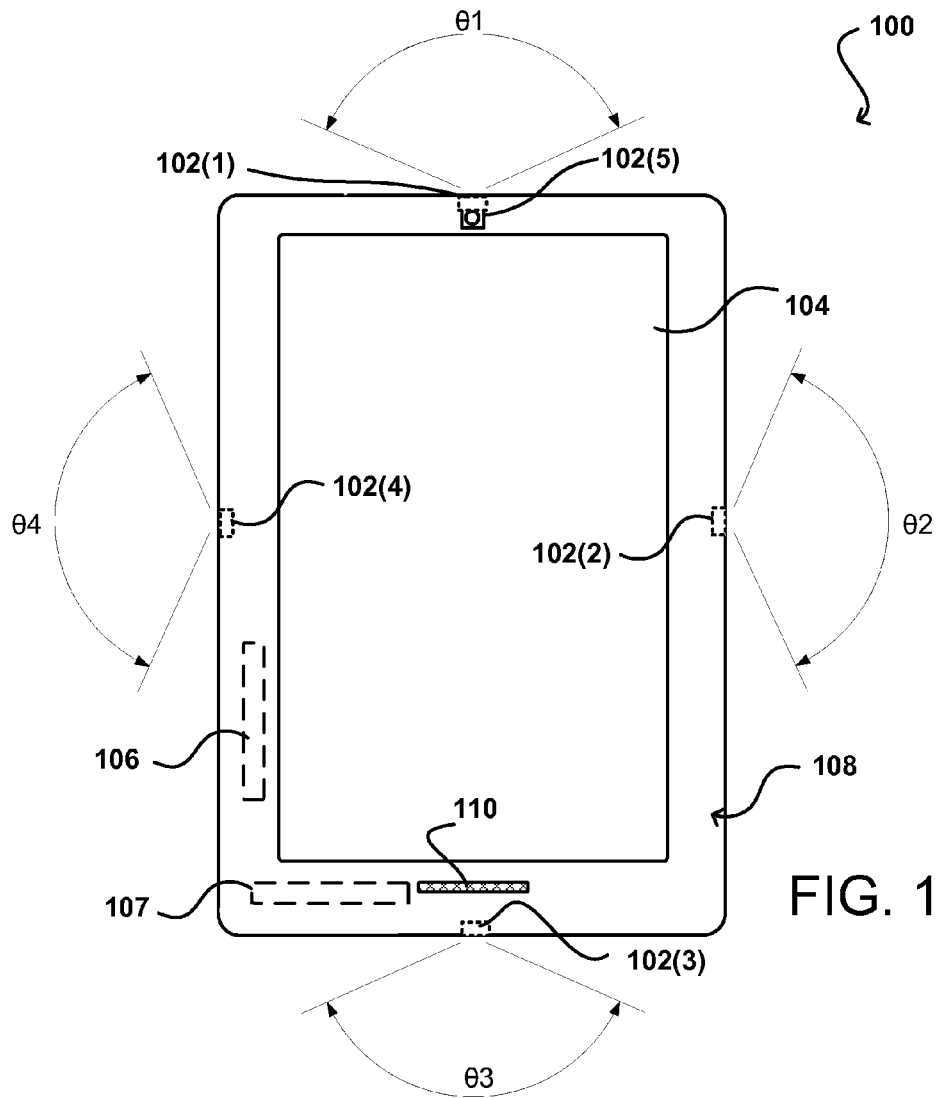
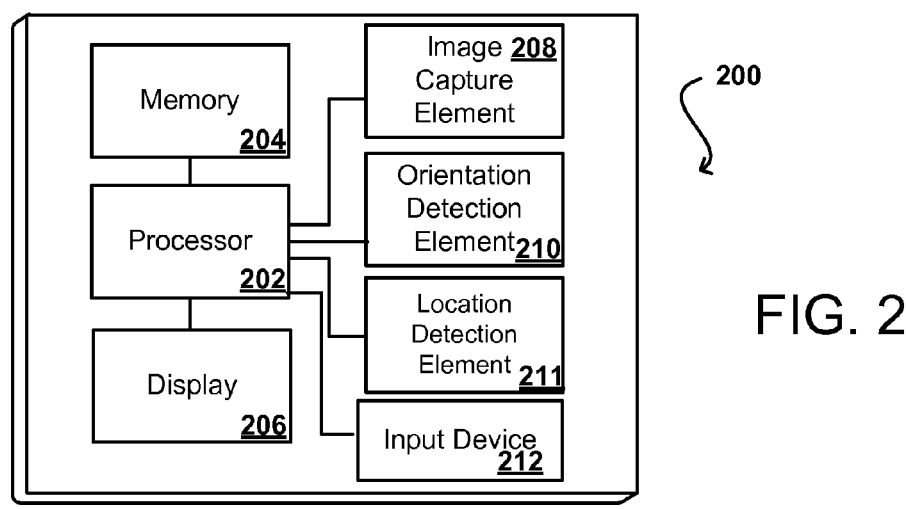

APPROACHES FOR DEVICE LOCATION AND COMMUNICATION

CROSS-REFERENCE TO RELATED APPLICATIONS

This application is a continuation application of U.S. Nonprovisional application Ser. No. 12/763,118, filed Apr. 19, 2010, entitled "APPROACHES FOR DEVICE LOCATION AND COMMUNICATION," which is incorporated herein by reference in its entirety for all purposes.

BACKGROUND

The number of people utilizing portable computing devices to communicate with each other, as well as the number of available computing devices, continues to increase. Today, in order to deliver a document or any other type of information electronically via a portable computing device to another person requires the sender to know certain information about the recipient, such as an email address, phone number or network address. Alternatively, a user may load the document onto a flash drive or other storage medium and provide the storage medium to the other user, which requires the other user to ignore possible security risks and load the document from the storage medium onto another device.

Certain technologies such as Bluetooth® and wireless networking (e.g., Wi-Fi) enable users to share information wirelessly. However, these wireless technologies still require a sender to obtain an identifier associated with the recipient or the recipient's device that the sender would like to share information with. For example, in some instances, the sender's device may display a list of available recipient devices that can be selected in order to establish a connection between the sender's device and the recipient's device. The list of available devices typically does not provide any information other than a proxy name associated with the recipient device. Thus, in a room of multiple people, it can be difficult (if possible at all) to determine which device belongs to which person in the room simply by looking at the list of available devices.

BRIEF DESCRIPTION OF THE DRAWINGS

Various embodiments in accordance with the present disclosure will be described with reference to the drawings, in which:

FIG. 1 illustrates an example device including components that can be used to provide input in accordance with various embodiments;

FIG. 2 illustrates an example component-level view of a device that can be used in accordance with various embodiments;

DETAILED DESCRIPTION

Figure 3:
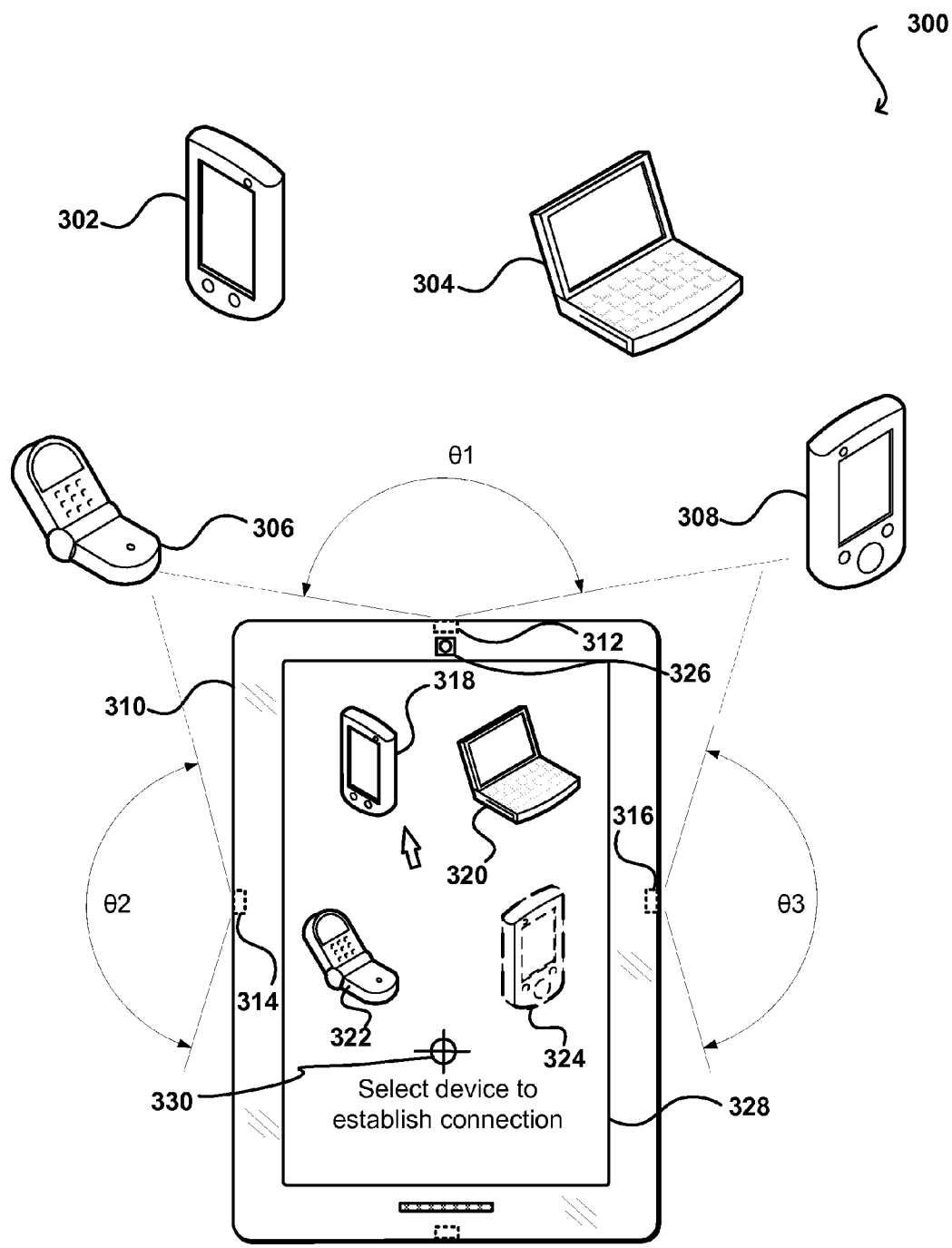
FIG. 3 illustrates an example layout in which a device is able to locate other nearby devices in accordance with one embodiment.

The technology presented herein describes an electronic device that may detect the presence of other devices based on captured images. When other devices are detected, the electronic device can determine a location of each of the other devices relative to the electronic device and determine an ability to communicate with each of the detected devices. Using this information, the electronic device can display a graphical element representing the detected device in a user interface. The graphical element can be displayed in the user interface in a location representing the location of the detected device relative to the electronic device. The graphical element may be accompanied by at least one of identity information associated with the detected device and an ability to communicate with the detected device.

Various other applications, functions, and advantages are presented below with respect to the various embodiments. It should be understood that the description and figures provide a number of examples, but the alternatives and variations possible within the scope of the various embodiments are not fully described. These alternatives and variations, however, would be apparent to one of ordinary skill in the art in light of the teachings and suggestions contained herein. It should be understood that reference numbers are carried over between figures to identify similar elements for purposes of simplicity of explanation alone, and this should not be interpreted as limiting the scope of the various embodiments or showing various options as part of the same embodiment.

FIG. 1 illustrates an example of a portable computing device 100 that can be used with various embodiments discussed herein. For purposes of explanation, the primary portable electronic device described herein will be referred to as a "client device" that is able to detect the presence of, and communicate with, other nearby devices. The example client device 100 includes conventional computing elements, such as a processor and memory, as discussed in more detail below with regard to FIG. 2, as well as image capture elements 102 and a display element 104. The client device 100 may also include one or more orientation detection elements 106, a location detection element 107, a housing 108 and a microphone 110. The display element 104 can comprise a display screen, touch-sensitive or otherwise, which can display various graphical elements as part of a graphical user interface (GUI). A GUI can enable the user of the client device to input various characters or text, select various elements or commands or provide another such input, using various approaches discussed herein and known in the art for such purposes.

The orientation detection element(s) 106 (e.g., an accelerometer or gyro element) can be used to determine orientation, motion or other movement or changes in orientation of the client device 100. The client device can also include at least one other conventional input mechanism (not shown), such as one or more user input elements (e.g., buttons, pressure-sensitive surface), positioned at any appropriate location on the client device, such as the front surface as in conventional devices (e.g., as part of a keyboard or keypad) or the side or back surface of the device such that a user holding the client device would likely be able to press or otherwise activate the button(s) without having to substantially shift hand positions. Various other input elements can be used as well, such as an audio input using a microphone element 110, etc.

Image capture elements 102 capture one or more images that may be used to detect the presence of another device, and in some embodiments, determine the location of a detected device relative to the client device. The example client device 100 shown in FIG. 1 includes six image capture elements 102, with each of the image capture elements 102(1)-102(4) located on each of the four sides of the device, image capture element 102(5) located on the front side or top of the device, and an image capture element on the back side or bottom of the device (not shown). In some embodiments, an image capture element 102 may be a charge coupled device (CCD), a digital still camera or a video camera and may include a lens for altering the field of view of the image capture element 102. In other embodiments, an image capture element 102 may be an infrared element.

Each of the image capture elements 102 shown in FIG. 1 has a field of view θ. As shown in FIG. 1, image capture element 102(1) has a field of view θ1; image capture element 102(2) has a field of view θ2; image capture element 102(3) has a field of view θ3; and image capture element 102(4) has a field of view θ4. The field of view for each image capture element 102 may be the same or have a varying field of view. Image capture elements 102(1)-102(4) enables the client device 100 to capture one or more images in substantially any direction from the client device without having to move or rotate the client device. The configuration of image capture elements 102 shown in FIG. 1 is for example only. Image capture elements 102 can be positioned on the client device in other locations that are least likely to interfere with the user's comfortable operation of the device.

The location detection element 107 can be used to determine the location of a detected device relative to the client device. In some embodiments, a location detection element 107 may be an infrared (IR) transceiver. In other embodiments, a location detection element 107 may be a GPS or ultra-wide band (UWB) transceiver. Regardless of the type of transceiver, the location detection element 107 is used to determine a location of a detected device relative to the client device. In instances where the client device and at least one detected device each include a UWB transceiver, a UWB technique may be used to determine the location of the detected device relative to the client device. UWB uses round-trip time of flight measurements for estimating the location of another device relative to the client device. This UWB technique, which is known in the art, measures the total elapsed time for a two-packet exchange between the client device and a detected device.

FIG. 2 illustrates example components of a computing device 200, such as the client device 100 shown in FIG. 1. In this example, the device includes a processor 202 for executing instructions that can be stored in a memory device or element 204. As is known in the art, the device can include many types of memory, data storage or computer-readable media, such as data storage for program instructions for execution by the processor 202, a separate storage for images or data, a removable memory for sharing information with other devices, etc. The device typically will include some type of display element 206, such as a touch screen or liquid crystal display (LCD), although devices such as portable media players might convey information via other means, such as through audio speakers. In addition, the device may acquire many different types of information (e.g., location, presence, identity etc.) and provide this information to another device with a display element.

An image capture element 208 may be, by way of example only, an ambient light camera, infrared (IR) transceiver or any combination thereof. An image capture element can include any appropriate optical element useful in providing sufficient angular spread, focal range and viewable area to capture one or more images of a user of the device, an intended target and/or devices positioned around the client device within a given range. Methods for capturing images using one or more image capture elements with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

Orientation detection element 210 is able to determine and/or detect orientation and/or movement of the device 200. Methods for using elements such as accelerometers to determine orientation or movement of a device are also known in the art and will not be discussed herein in detail. A location detection element 211 may be, by way of example only, an image capture element, a UWB transceiver, a GPS transceiver, an IR transceiver or any combination thereof. In some embodiments, the device can include at least one additional input element 212 able to receive input from a user. An input element can include, for example, a push button, touch pad, touch screen, touch-sensitive material, wheel, joystick, keyboard, mouse, keypad or any other such device or element whereby a user can input a command to the device. A client device may also include a microphone or other audio capture element (shown as microphone 110 in FIG. 1) that accepts voice or other audio commands. In this case, a device could be controlled through a combination of visual and audio commands, such that a user can control the device without having to physically contact the device.

FIG. 3 illustrates a configuration 300 wherein a client device 310 is nearby four other computing or electronic devices: an electronic book reader 302 (also referred to herein as a reader), a notebook computer 304, a cellular phone 306 and a portable data assistant (PDA) 308. As described above, the image capturing elements of the client device may continually capture images, periodically capture images, etc. The configuration shown in FIG. 3, which by way of example only, represents the client device 310 being held by a user and located within the same room as the other devices 302, 304, 306, 308.

FIG. 3 illustrates that each image capture element has a field of view θ. Image capture element 312 has a field of view θ1. Image capture element 314 has a field of view θ2. Image capture element 316 has a field of view θ3. Image capture element 318 also has a field of view, but the field of view is not visible from the perspective of the client device shown in FIG. 3. FIG. 3 further illustrates that, in some embodiments, the field of view of an image capture element may overlap with another image capture element. For example, field of view θ1 overlaps with field of view θ2 at some distance from the device. Similarly, field of view θ1 overlaps with field of view θ3 at some distance from the device. It is not required that the image capture elements have overlapping fields of view.

Client device 310 may also detect the presence of another nearby device and determine the physical location of each nearby device based at least in part on the image(s) captured by the image capture elements. Using the configuration 300 shown in FIG. 3, the client device 310, through image capture elements 312 and 314, may capture at least a portion of the cellular phone 306 in an image because cellular phone 306 is within the field of view of both the image capture elements 312 and 314. Similarly, image capture element 312 and image capture element 316 may capture at least a portion of the PDA 308 in an image because the PDA 308 is within the field of view of both image capture elements 312, 316. Depending upon the tilt angle of the client device, the image capture element 326 or an image capture element located on a back surface of the device 310 (not shown) might also capture at least a portion of the cellular phone 306 and/or PDA 308. In some embodiments, the client device itself is able to detect the presence of a nearby device (e.g., cellular phone 306) when at least a portion of a nearby device is present in a captured image. In other embodiments, the client device delivers the one or more captured images to a remote service that is able to detect the presence of a device based on the captured image(s). In this instance, the client device may receive a response from the remote service indicating whether a device is present in the one or more captured images. Any image recognition technology known in the art today may be used for detecting the presence of a device in a captured image.

Upon detecting the presence of another device in a captured image, an algorithm executing on the client device 310 (or remote to the client device) can determine an approximate location of each detected device relative to the client device 310 using one or more captured images, IR, UWB or any combination thereof. Suppose that each image capture element 312 shown in FIG. 3 is, for example, a camera that may capture one or more images that includes at least a portion of reader 302, laptop 304, cellular phone 306 and PDA 308. Based at least in part upon the image captured by image capture element 312, the client device 310 (or remote service) can determine an approximate direction of each of the devices 302-308 with respect to the client device 310.

Client device 310 (or remote service) can, in some embodiments, approximate a distance from the client device 310 to each of the detected devices 302-308. For example, the client device 310 may include a first algorithm that determines the distance of the electronic book reader 302 from the client device 310 based on the size of the book reader in the one or more captured images. In some embodiments, the client device 310 can deliver the one or more captured images to an image recognition service (or other such source) to determine a likely type and/or model of the reader 302. In some embodiments, information identifying a model or type of device might be contained in a label on the device or sent as part of a transmission from the device. Based at least in part upon this information, an algorithm can correlate the size of the particular model of the device, for example, with the apparent size of the device in the image, in order to more accurately determine a distance from the client device 310 to the reader 302.

The distance from the client device 310 to another device may also be determined using more than one captured image. For example, in embodiments where at least two image capture elements capture an image showing at least a portion of the reader 302, the client device 310 (or remote service) can analyze both images in order to attempt to perform triangulation or another similar process for determining the location of the reader 302 relative to the client device 310. For example, the client device 310 can analyze a first image from the first image capture element 312 that includes at least a portion of the cellular phone 306 and a second image from the image capture element 314 also including at least a portion of the cellular phone 306. Upon analyzing the first and second images, the client device 310 (or remote service) can determine a relative size of the cellular phone 306 and/or location of the cellular phone 306 relative to the client device 310. In some embodiments, the client device can also determine the approximate distance from the client device to the cellular phone 306.

FIG. 3 illustrates that the client device 310 can present to a user, via a display element 328, a position of detected computing devices relative to the client device 310. In FIG. 3, an icon or image is displayed or presented in or on the display element 328 representing each detected device (e.g., cellular phone 306, reader 302). In some embodiments, a client device icon 330 is also displayed on display element 328. For example, in FIG. 3, a cellular phone icon 322 is displayed on display element 328 relative to the client device icon 330 representing the location of the cellular phone 306 relative to the client device 310. Similarly, an electronic book reader icon 318 is displayed on display element 328 relative to the client device icon 330 representing the location of the reader 302 relative to the client device 310. A notebook icon 320 is also displayed on display 328 relative to the client device icon 330 representing the location of the notebook 304 relative to the client device 310. Finally, a PDA icon 324 is displayed on display 328 relative to the client device icon 330 representing the location of the PDA 308 relative to the client device 310. In some embodiments, the icons visible on display 328 may be actual images of the various detected devices (e.g., retrieved from a captured image). In other embodiments, when the type of device may be determined, the icons visible on display 328 may include stock images of the detected device, as may be retrieved from a central data store or other such location from across a network or stored on the client device.

In some embodiments, one or more of the image capture devices of the client device are, or also include, an infrared (IR) transceiver to emit and receive focused infrared radiation for short-range communication. The client device 310 may also include one or more IR transceivers in addition to the image capture elements. The IR transceiver can conform to an appropriate transmission standard, such as the standards set forth by the Infrared Data Association (IrDA). The client device can include at least one optical modulator operable to modulate the infrared beam from at least one IR transceiver in order to encode data within the generated beam. For example, a device number may be encoded inside the IR signal transmitted by a device. As will be discussed in more detail later, the client device would then be able to identify the detected device based on the encoded IR signal transmitted by the detected device. The client device can also include at least one photodiode or similar element operable to receive transmitted IR radiation, which can be demodulated in order to extract the information encoded into the received signal.

In the instance where the client device 310 has at least one infrared receiver (or transceiver) capable of receiving a transmission from an infrared transmitter of another device (e.g., cellular phone 306), the client device 310 can determine an ability to communicate between the client device 310 and the other detected device(s). It should be understood, of course, that infrared signals are used for purposes of explanation only, and that any other appropriate type of signal can be used in accordance with the various embodiments. FIG. 3 illustrates an example whereby the client device 310, either as part of the initial device detection process or as part of a separate process, has determined that the client device 310 has an ability to communicate with the electronic book reader 302, notebook computer 304 and cellular phone 306. A user of the client device may visibly confirm that the client device 310 has an ability to communicate with each of these devices because the reader icon 318, laptop icon 320 and the cellular phone icon 322 are shown on display 328 with solid lines. FIG. 3 also illustrates that the client device 310 has determined that it has no ability to communicate with the PDA 308. Again, a user of the client device 310 can visibly confirm that the client device 310 cannot communicate with the PDA 308 because the PDA icon 324 is shown in hidden lines on display 328. The communication state of another device may be displayed in other ways such as, but not limited to, a color, highlighted, animated or any other state that would allow the display 328 to differentiate devices that may communicate with the client device as opposed to devices that cannot communicate with the client device.

In some embodiments, a user can provide certain other users with a code that the other users can enter into their respective devices. This code then can be broadcast with each communication from the devices having that code, such that only certain devices can communicate with each other even though multiple other devices might receive the transmissions, as the other devices would not have the code needed to decode the information in the transmissions. Any other code/key value may be broadcast with each communication to provide a secure handshake between devices. The code can be provided via any approach, such as email, instant messaging, social networking, file transfer or voice communication.

Figure 4A:
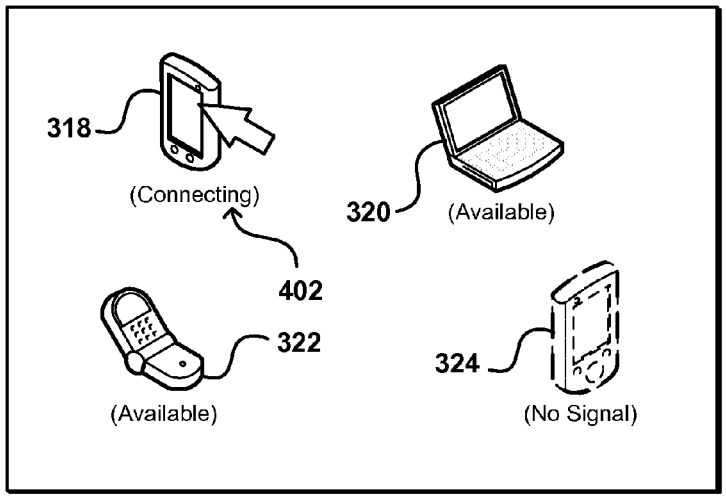
FIGS. 4(a)-4(c) illustrate example interface displays representing a connection status with respect to various detected devices that can be used in accordance with various embodiments.

As shown in FIG. 3, a user of the client device may select any one of the icons 318, 320, 322 to initiate a communication with the particular device. In some embodiments, a user may also select one of the icons 318, 320, 322 to prevent communications with the particular device. FIG. 4(a) illustrates an example display state 400 wherein the communication state of each device is displayed adjacent the device icon. Icon 320 indicates that the laptop 304 is available for communication with the client device. Icon 322 indicates that the cellular phone 306 is available for communication with the client device. Icon 324 indicates that the PDA 308 is not available for communication with the client device. FIG. 4(a) shows that a user has moved a selection element (e.g., a cursor) to select the icon 318 corresponding to the electronic book reader 302 in order to attempt to establish a connection between the client device and the reader 302. In some embodiments, the user could touch the icon 318 or perform another such selection action to establish communication between the client device and the reader 302.

FIG. 4(a) illustrates that the client device can display a connection state 402 for the selected icon, shown in FIG. 4(a) as "connecting," or any other similar message or indicator. Similar communication state information can be displayed along with the icons representing the other devices as well, such as an "available" state for the notebook icon 320 and cell phone icon 322, which represents that those devices are able to communicate with the client device, but do not yet have a connection established. A "no signal" state is displayed with the PDA icon 324, which indicates that the client device has not yet been able to determine an ability to communicate with the PDA 308. A user may also intentionally not want to establish communications with another device. In such a case, a user may perform an action (e.g., right click, touch or perform a touch gesture such as a tap or a swipe) on an icon visible on display 328 for a particular device and selecting an appropriate menu option. For example, the user may drag an icon visible on display 328 to a trash bin icon (not shown) or by adding an identifier associated with the selected device to a blacklist stored on the client device (or remote service). By doing so, the client device can prevent communication with the particular device.

In some embodiments, the client device emits a signal, via the infrared emitter (or other such communication element), toward the device represented by the icon selected by the user. The signal emitted by the client device may correspond to a "wake up" code, while in other embodiments the signal could correspond to a "please acknowledge" or "please identify yourself" code. Any appropriate encoding approach can be used as known or subsequently developed for transmitting information over a signal such as an infrared signal. When the device corresponding to the selected icon 318 (electronic book reader 302) receives the coded signal, the reader 302 can decode the signal and determine the contents of the request. In some embodiments, the reader 302 can automatically respond with an "acknowledge" message (or other similar code). In other embodiments, the reader 302 will prompt a user to first confirm the request or otherwise approve the sending of a response from the reader 302 back to the client device 310.

Figure 4B:
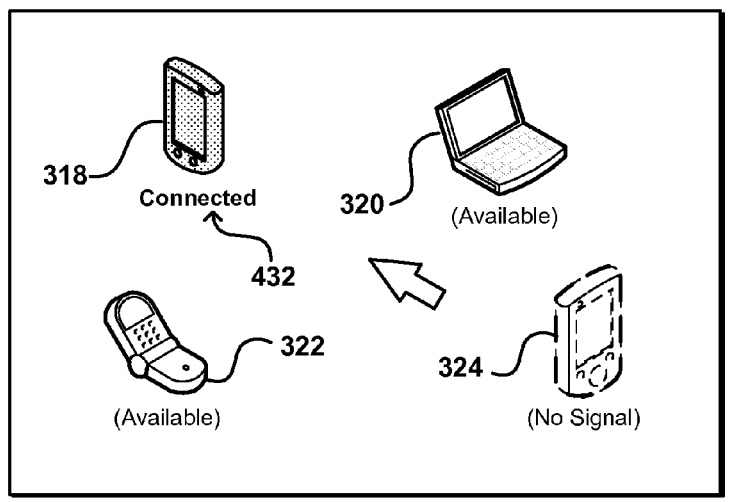

It is possible that the signal transmitted by the client device 310 may be received by nearby devices other than the device the user is intending to establish communications with (e.g., laptop 304, cellular phone 306, PDA 308, which are located in the same area as reader 302 in FIG. 3). In some embodiments, therefore, each electronic device responding to the request transmitted by the client device 310 can send identifying information along with the signal so that the client device 310 may be able to distinguish responses received from various devices. For example, returning to FIG. 3, if image capture element 312 is, or includes, an IR transceiver, a signal emitted from the image capture element 312 might be received by the cellular phone 306 and the electronic book reader 302 because both devices are within the field of view of the image capture element 312. When the client device 310 receives a response from the device associated with the selected icon 318, the communication state shown on display 328 can be updated, such as is illustrated in the example display state 430 of FIG. 4(b). In this example, the icon 318 for the selected device has changed in appearance (e.g., color or size) and/or updated communication state information 432 is displayed, indicating that a handshake or other connection action occurred between the client device 310 and the reader 302.

Approaches in accordance with various embodiments rely on some type of identifier, such as a client identifier, user identifier, etc., included within the responses received from the detected electronic devices responding to requests transmitted by the client device. By doing so, the client device can decode the information received from other devices (e.g., reader 302) it intends to establish a communication connection based at least in part upon the direction from which the signal was received by the client device. The client device can therefore associate the location of another device relative to itself and some identifying information associated with the other device.

In some embodiments, a detected device (e.g., book reader 302) can also automatically provide the client device 310 with information associated with a user of the detected device such as, but not limited to, the user currently logged into the detected device or the owner of the detected device. For example, the detected device can transfer to the client device information such as a name, an employer, an occupation or any other information that might be of interest to a user. It should be understood that any information can be transferred to the client device such as a gamer tag, social networking information and the like. This type of information can be sent to the client device as part of determining an ability to communicate with the other device, during a subsequent exchange of information between the client device and the detected device, or at any other time.

In other embodiments, the initial identifier received by the client device from the detected device (e.g., a user identifier or device identifier sent by the reader 302) can be used to obtain additional user information. Again, using the FIG. 3 example, an identifier received by the client device from the reader 302 can be referenced against contact information stored on the client device. In another example, the identifier received by the client device from the reader 302 can be delivered from the client device to a remote service that stores various types of information (e.g., address book, social network). Any additional information identified by the remote service that is related to the identifier may be returned to the client device for presentation to the user. In some embodiments, the identifier received by the client device from the reader 302 can correspond to a uniform resource locator (URL) identifying a location where information associated with the reader 302 can be obtained. In other embodiments, the identifier received by the client device from the reader 302 might include information that can be used by the client device to locate user information associated with the reader (e.g., by performing a search on the Internet). Various other sources of identity information can be used as well as should be apparent.

Figure 4C:
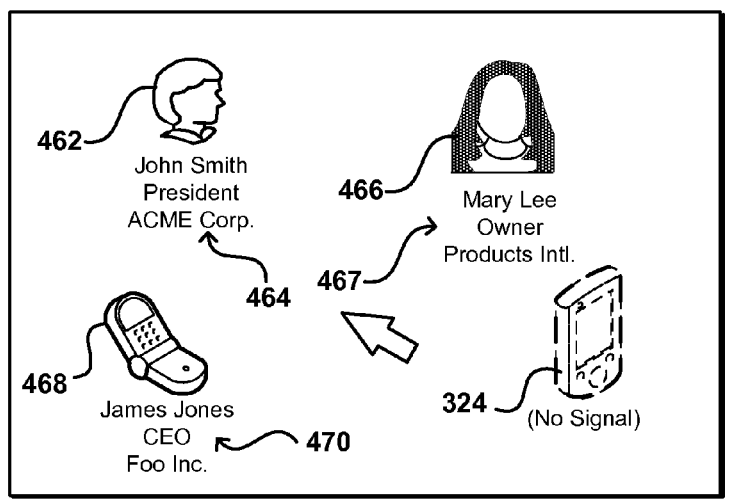

The identity information obtained by the client device, whether via itself or through a remote service, can be displayed (or be made available for display) to a user via the display 328 of the client device. FIG. 4(c) illustrates an example display state 460 wherein identity information associated with the reader 302, the laptop 304 and the cellular phone 306 have been obtained and displayed. In particular, FIG. 4(c) shows that user identity information associated with each device that the client device could establish communication with, the reader 302, the laptop 304 and the cellular phone 306, was obtained and is being displayed on display 328. As discussed above, various types of identity information associated with a device may be obtained. For reader 302 and laptop 304, the device icons 318 and 320 shown in FIG. 4(b) were replaced with user images or icons 462, 466. In some embodiments, the user images 462, 466 may be an actual image of the user associated with the device. In other embodiments, the user images 462 466 are stock "male" and "female" images. Of course, any type of image may be displayed (e.g., user's avatar). These personalized images can help a user of the client device confirm that the correct device was detected by the client device and may also help the user of the client device identify people in a meeting, social gathering and the like. The images can be determined using any of the identity-determining approaches discussed above. If a user image cannot be associated with a detected device, an image of the particular device (or other appropriate image) can be displayed, or the device can continue to show the original icon 468 as illustrated for the cell phone 306 in FIG. 4(c).

The client device can also display additional identity information associated with the user of the detected device. For example, user image 462 representing the reader 302 is displayed along with identity information 464, which in this example includes the user's name ("John Smith"), his company ("ACME Corp.") and his position ("President"). Similarly, user image 466 representing the laptop 304 is displayed along with identity information 467, which includes the user's name ("Mary Lee"), her company ("Products Intl.") and her position ("Owner"). In the example shown in FIG. 4(c), client device 310 could not identify or locate a user image associated with cellular phone 306. Thus, phone icon 468 is displayed representing the phone 306. Even though a user image could not be displayed, identity information 470 associated with the cellular phone 306 was identified and is displayed, which includes the user's name ("James Jones"), his company ("Foo Inc.") and his position ("CEO"). As discussed above, the identity information 464, 467, 470 displayed along with icons 462, 466 and 468 may have been obtained automatically by the client device itself, through a remote service or a combination thereof. Identity information may also be manually input by a user into the client device. Using the example shown in FIG. 4(c), in the event that the client device (or remote service) could not obtain any identity information associated with the reader 302, the user of the client device could manually enter identity information 464 into an address book, contact list, etc. of the client device or a remote service accessible by the client device so that identity information 464 can be displayed as shown in FIG. 4(c).

Other types of information associated with a particular device may be viewed as well. A user of the client device may customize the types of information displayed along with a device icon or user icon representing a detected device. For example, using the example shown in FIG. 4(c), a user, via the client device, may also view information such as how much business the user (or the user's company) has received from Foo Inc., Foo Inc.'s sales information, etc. In another example, a user in a business meeting might choose for the client device to show the company and title associated with the user of the device, as illustrated in the example information 464 displayed along with the icon 462 representing the user of the reader 302. In a social setting, however, a user of a client device might prefer that the client device show other types of information along with a device icon or user icon such as a user's hobbies, family members, mutual friends and the like.

A limited amount of identity information may be visible at one time in display 328 of the client device 310 due to the size limitations of display 328. In some embodiments, a device icon or user icon may be selected to obtain additional information about a particular user. Using the example provided in FIG. 4(c), the user icon 462 may be selected to view additional information about John Smith. In some embodiments, a pop-up screen or window will appear on display 328 of the client device 310 upon selection of the user icon 462. The pop-up screen may include any appropriate information for that identified user that may be obtained by, or delivered to, the client device such as a user's personal bio, performance history, past communications with the user or list of recent articles written by or about the user. A user may have the ability to prevent others from obtaining certain types of non-public information about them. For example, a user may designate certain information as "public" information that anyone may view while other types of information are "private" information that may be accessed only by others with permission of the user. A user may also prevent any type of identity information from being obtained by a particular device. For example, if a user's client device detects a device associated with a competitor, the user can select the competitor's device or user icon visible on the display and select a "block information" option that would prevent the competitor's device from obtaining information about the user.

In order for the client device to properly locate and identify the devices associated with these users, as discussed above, the client device needs to be able to image or otherwise obtain information about the devices. As discussed above, this can involve a client device having one or more image capture elements positioned at appropriate locations on the device. Depending at least in part upon the type of image capture element and the intended use, there can be a number of potential variations and configurations used to capture information about nearby devices. As discussed previously with respect to FIG. 3, there can be an imaging element or camera on one or more sides of the client device, such that a substantially rectangular device can have six image capture elements/cameras in certain embodiments, although there could be more than one image capture element on a side or there can be at least one side that does not include an image capture element. For example, a "lower" edge of the device (e.g., the edge facing the user when the user is operating the device) might not include an image capture element in certain embodiments as the image capture element from that side might be unlikely to pick up devices that were not able to be captured by an element on one of the adjacent sides.

Figure 5A:
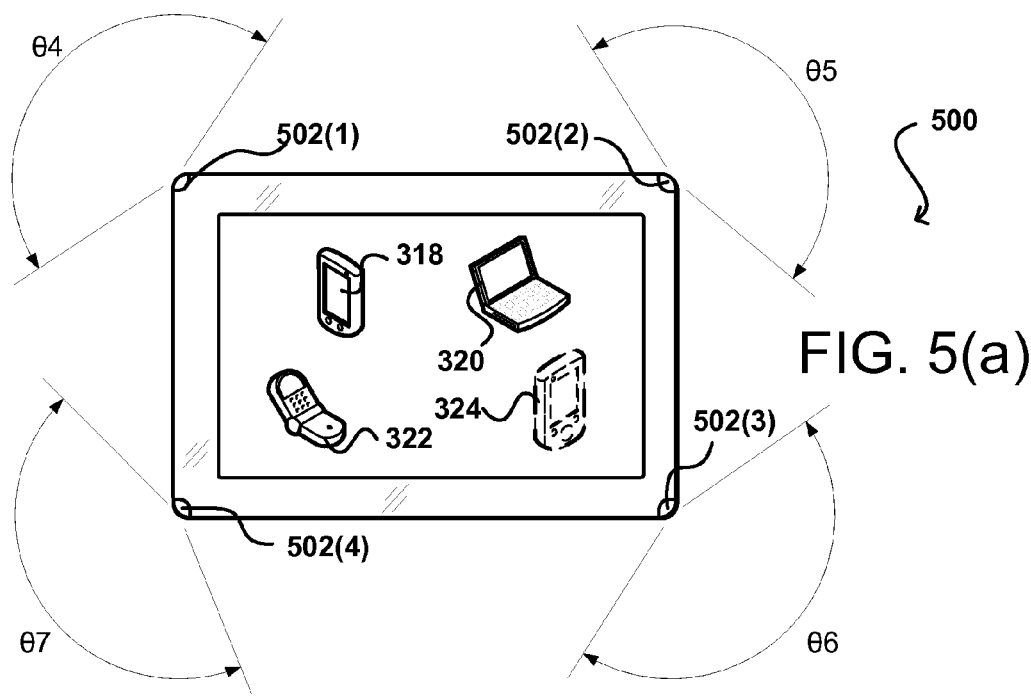
FIGS. 5(a)-5(d) illustrate example device configurations that can be used in accordance with various embodiments.

FIGS. 5(a)-5(d) illustrate a client device with additional configurations of image capture elements. FIG. 5(a) illustrates a client device 500 including four image capture elements 502(1)-502(4). Each image capture element 502 is positioned on one of the corners of the client device 500. Image capture element 502(1) has a field of view θ4. Image capture element 502(2) has a field of view θ5. Image capture element 502(3) has a field of view θ6. Image capture element 502(4) has a field of view θ7. Similar to the image capture elements shown in FIG. 3, each image capture element 502 may have the same, or varying, field of view. Even though the field of view shown in FIG. 5(a) for each image capture element is less than 180 degrees, in some embodiments, one or more of the image capture elements may be a wide angles lens (e.g., fisheye lenses) that has a field of view of 180 degrees or more.

Figure 5B:
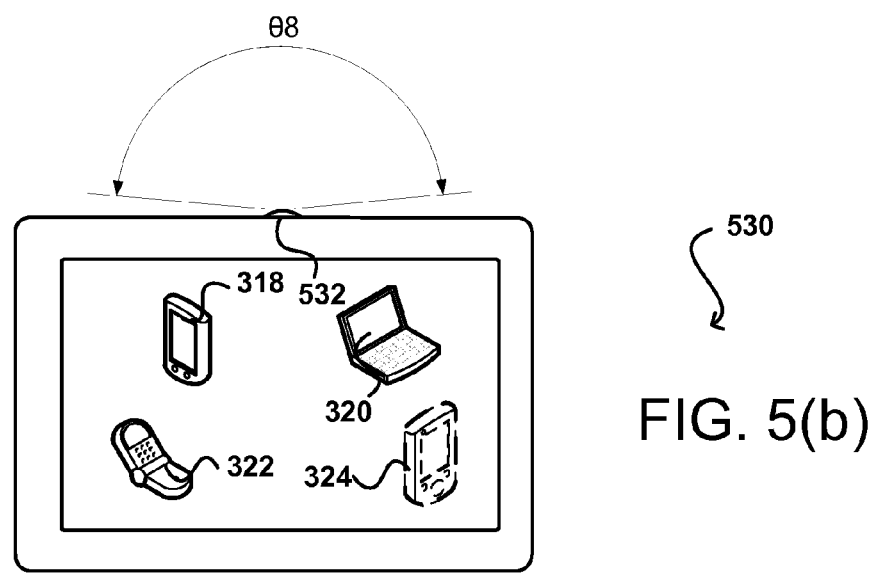

FIG. 5(b) illustrates a client device 530 with a single image capture element 532 having a field of view θ8. A client device with a single image capture element will capture images only within the field of view of the one image capture element. Thus, if image capture element 532 was located on a front surface of the client device 530 (as shown in FIG. 5(b)), a user may be required to point the image capture element 532 in other directions, or move the client device left or right, to capture images of areas other than the area directly in front of the client device at the moment. However, a client device with a single image capture element can be less complex and less costly than a client device with multiple image capture elements. This embodiment may be used, for example, in a classroom environment where the teacher and teacher's device are positioned at the front of the room, and the students are all seated in front of the device.

Figure 5C:
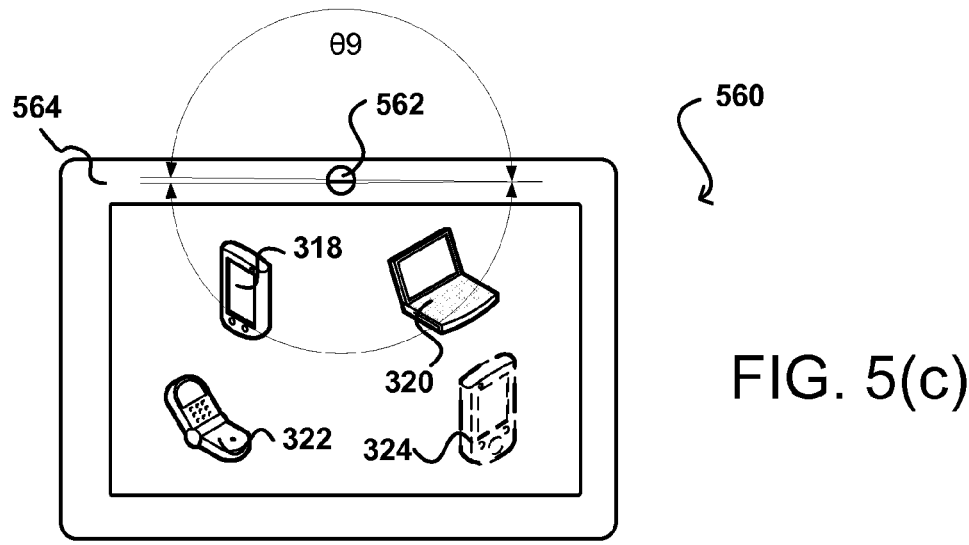

FIG. 5(c) illustrates another alternative configuration of a client device. Client device 560 includes a single image capture element 562 positioned on a front face 564 of the client device 560. In some embodiments, image capture element 562 may capture images only of the area in front of the client device (e.g., towards a user holding the client device 560 with the display facing the user). In other embodiments, the image capture element 562 is able to capture a panoramic image (e.g., a 360° view). The image capture element 562 can contain more than one lens or optical element in some embodiments in order to improve viewing angle, minimize optical defects or artifacts due to the wide viewing angle or perform a similar function.

Figure 5D:
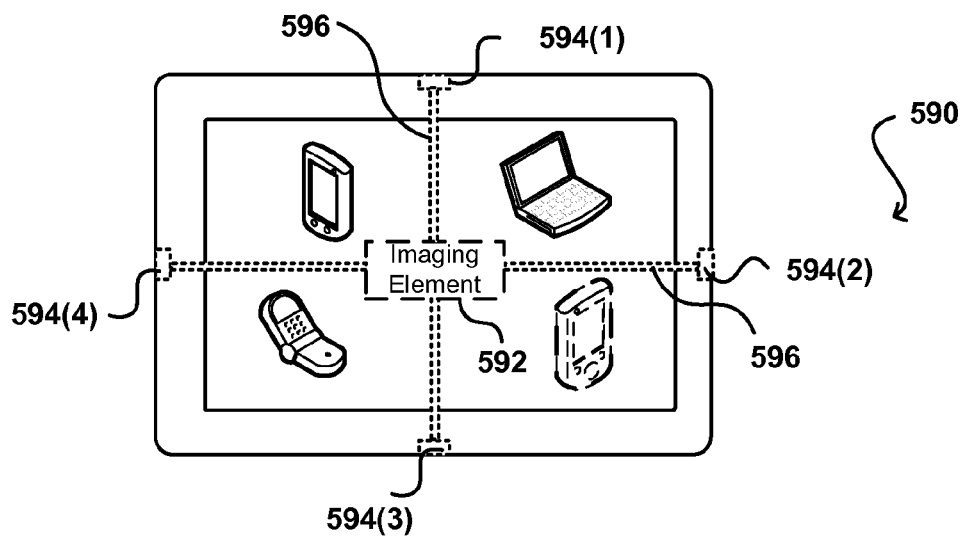

FIG. 5(d) illustrates another configuration of a client device. Client device 590 includes an imaging element 592 and four lenses 594(1)-594(4). Similar to the image capture elements 312, 314, 316 shown in FIG. 3, each lens 594 in the client device 590 may have a similar or varying field of view. Each lens 594 is connected to the imaging element 592 by, for example, a light tube 596. A light tube 596 may be, by way of example only, a fiber optic cable, a tube lined with highly reflective material or any other device or element known in the art for transporting light/signals from one location to another. Each light tube 596 is used for transporting or distributing light entering a lens 594 to the imaging element 592. In some embodiments, a lens 594 is a shutter device that allows light to pass through the lens for a determined period of time, for the purpose of exposing the imaging sensor to light to capture an image. In this instance, the client device 590 may be able to control and coordinate the operation of each lens 594 for capturing one or more images. One advantage of client device 590 is reduced cost of a single imaging element.

Figure 6A:
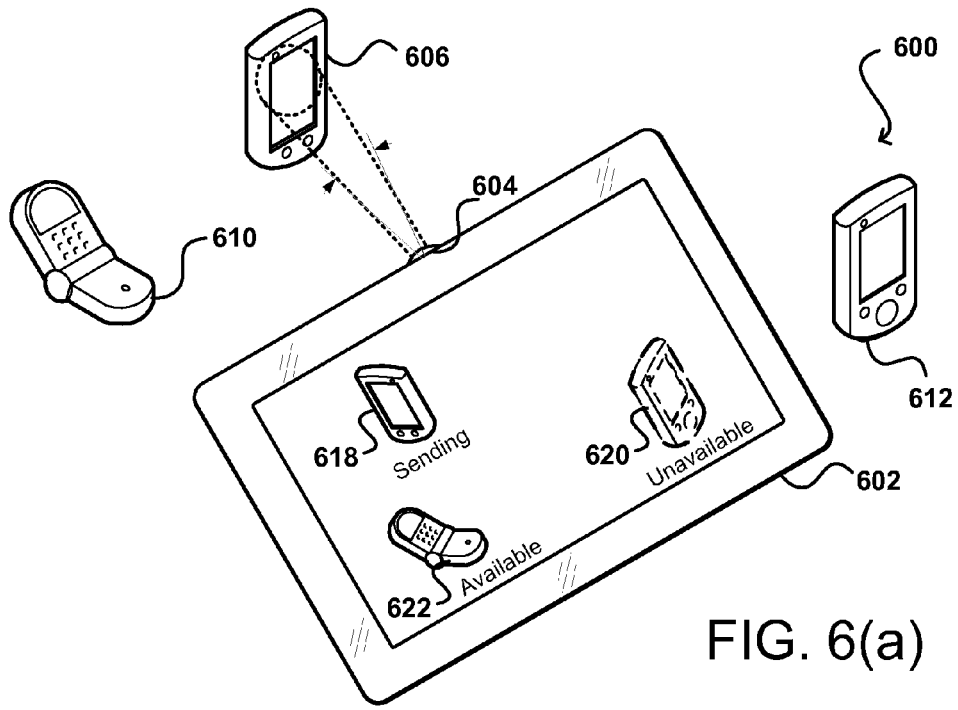
FIGS. 6(a)-6(b) illustrate example device configurations that can be used in accordance with various embodiments.

FIG. 6(a) illustrates an example client device 602 that includes an IR communication element 604 with a limited angular transmission range. As shown in FIG. 6(a), client device 602 has detected reader 606, cellular phone 610 and PDA 612, and icons 618, 620 and 622 are visible on the display of client device 602. In the example configuration 600 shown in FIG. 6(a), the client device 602 may communicate with a single device, for example device 606, upon the user pointing the communication element 604 at a current location of device 606. One advantage to such an approach for communicating between devices is that the other devices 610, 612 nearby the client device 602 will not also receive the transmission from the client device 602 to the selected device 606. If the user of the client device wants to share information with the other devices 610, 612, the user can point the communication element 604 of the client device 602 at each of the devices 610, 612 and resend the transmission. Such an approach (limiting communication to a single nearby device) can provide an additional level of security, but can introduce some redundancy when information is to be shared among several devices. If the client device includes more than one IR transceiver, upon selection of icon 618, information provided by one or more of the accelerometers in the client device may be used to determine which one of the IR transceivers should be used to transmit information to the device 606.

Figure 6B:
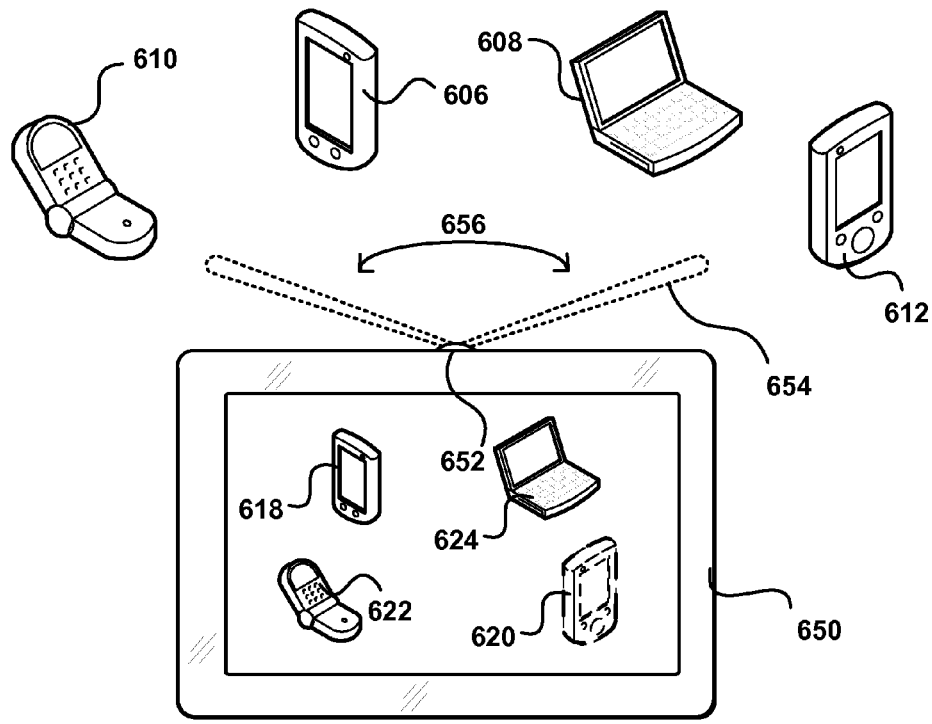

FIG. 6(b) illustrates an example client device 650 including an image capture element 652 that is able to scan a viewing area 656 with a limited angular field of view 654. The image capture element 652 may capture one or more images (e.g., digital images) each covering a portion of the viewing area 656. Using such a configuration, the client device 650 can provide a "detection" mode wherein the image capture element 652 periodically (or continually) scans the area 656 in order to detect nearby electronic devices.

Image capture element 652, upon scanning area 656, may capture one or more images as the element 652 moves from left to right (from the perspective shown in FIG. 6(b)). Using the example provided in FIG. 6(b), image capture element 652 may capture multiple images, where each image captures at least a portion of the cellular phone 610, the reader 606, the laptop 608 and the PDA 612. Upon detecting at least a portion of a device based on the captured image(s), the client device 650 can determine an approximate current location of the detected device, as previously discussed above. The device icons 618, 620, 622 and 624 are displayed on client device 650 representing the cellular phone 602, reader 606, laptop 608 and PDA 612. Each of the icons is displayed in the locations of each detected relative to the client device 650.

In the instance where the image capture element 652 also includes a communication element (e.g., IR transceiver), the client device 650 also can provide a "communication" mode where the image capture element 652 can be focused to communicate with a particular device. For example, the client device 650 could adjust the image capture element 652 such that only a single device, i.e., the cellular phone 610, is located within the field of view 654. As discussed above, such an approach enables communication without identifier codes or when used with identifier codes, can prevent other devices from receiving and decoding the transmissions.

Figure 7A:
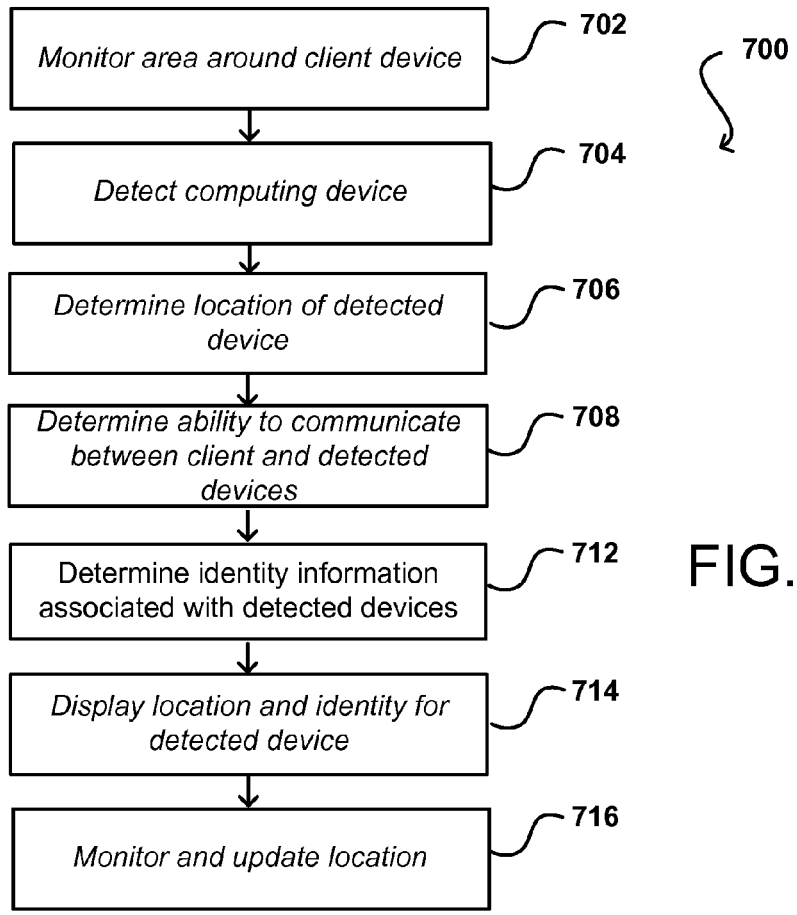
FIGS. 7(a)-7(b) illustrate example processes for locating and identifying at least one of a plurality of devices that can be used in accordance with one embodiment.
Figure 7B:
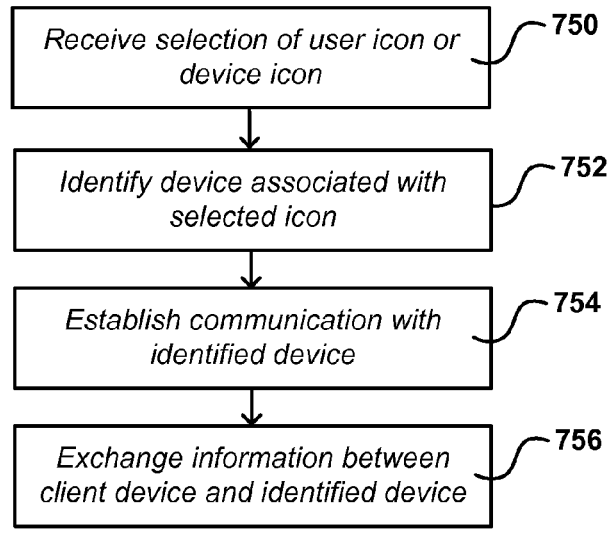

FIG. 7(*a*) illustrates an example process for detecting at least one device nearby a client device and communicating with the detected device(s). At box 702, a client device begins monitoring the surrounding area. The monitoring can begin automatically or upon request of the user or another appropriate source. As discussed above, a client device monitors the surrounding area, in some embodiments, by capturing one or more images with the device's image capture elements.

At box 704, the client device, using the captured image(s), can detect the presence of at least a portion of a device (e.g., a computing device or communication device). Detecting at least a portion of a device in a captured image can involve any process discussed herein, such as image recognition based on ambient light or infrared radiation. In some embodiments, box 704 may be performed by the client device. In other embodiments, box 704 is performed by a remote service that receives the captured image(s) from the client device for detection analysis.

When at least a portion of a device is present in a captured image, the client device can determine the location of the detected device relative to the client device, at box 706, such as by using image analysis and/or triangulation to determine a direction and relative distance to each device. In some embodiments, box 706 is performed by a remote service that receives the captured image(s) from the client device for location analysis. At box 708, the client device determines an ability to communicate with one or more of the detected devices.

At box 712, the client device determines identity information associated with one or more of the detected devices. The client device, in some embodiments, emits a request for identification to a detected device. In this case, the client device can receive a response to the request for identification from the detected device. Alternatively, the detected device might emit a heartbeat or other signal that may be received by the client device, such that the client device does not need to emit a request for identification. Identity information may include information associated with a user of the device (e.g., user's name) or the device itself (e.g., cellular phone, PDA). As discussed above, the client device may obtain additional identity information associated with a user of the device or the device itself by using the initial identity data received from the detected device. Using the identity information (box 712) and location information (box 706), the client device can display a device icon or user icon on the display representing the detected device, at box 714. As discussed above, each icon is visible on the display in a location relative to the client device. The client device may also display identity information for the detected device (when available).

It is not likely that detected devices will remain in the same position relative to the client device as was initially displayed by the client device. If, for example, FIG. 3 represented client device 310 in the same room as the other devices 302-308, users of the devices 302-308 are likely to move about, leave the room, return to a different location in the room and the like. Therefore, the client device can periodically (or continuously) update the location of each detected device visible on display 328 by updating the displayed location of each user icon or device icon to accurately represent the current location of the detected device relative to the client device. In addition, a new user icon or device icon may be added to the display of the client device when a new device is detected. Similarly, a device may be removed from the display when the device is no longer detected by the client device or is removed by the user of the client device.

At box 716, the client device periodically monitors the area surrounding the client device and updates any location and/or identity information associated with each detected device. In general, box 716 is accomplished by repeating boxes 702-714. Using the client device 310 shown in FIG. 3, for example, the image capture elements of the client device 310 may periodically (or continuously) capture images. When at least a portion of another device is located in a captured image, the client device (or remote service) determines the location of the detected device (box 706).

FIG. 7(*b*) illustrates that a client device can exchange information with another device it has detected without requiring the user to have any knowledge about the detected device. This is in contrast to several methods of communication known in the art today that require a user to have some knowledge of the other device or the other user in order to communicate with the other user. For example, a user cannot send a text message to another device without knowing the phone number or contact information associated with the other device. As another example, a user cannot send an email to another user without knowing the other user's email address. Here, in contrast, the client device displays icons representing each detected device that a user may select to initiate communication with a particular device without having to know any information about the detected device.

At box 750, the client device receives a selection of one of the displayed user icons or device icons (e.g., device icon 318 in FIG. 3). At box 752, upon receiving the selection of the icon, the client device identifies the device associated with the selected icon (e.g., reader 302). At box 754, the client device establishes communication with the reader 302. At box 756, the client device is enabled to communicate and exchange information with the reader 302. In some embodiments, a user may select only an icon that is available (e.g., icon is displayed in solid lines, a certain color, indicates "available") to initiate communication with the particular device. In other embodiments, a user may select an icon indicating that a device is unavailable (e.g., hidden lines, a certain color, indicates "unavailable", etc.) to initiate communication with the particular device. In this case, the client device will attempt to determine if it can communicate with the selected device. If the client device determines that it has an ability to communicate with the selected device, the client device will perform the actions shown in the boxes 750-756 in FIG. 7(*b*).

Figure 8:
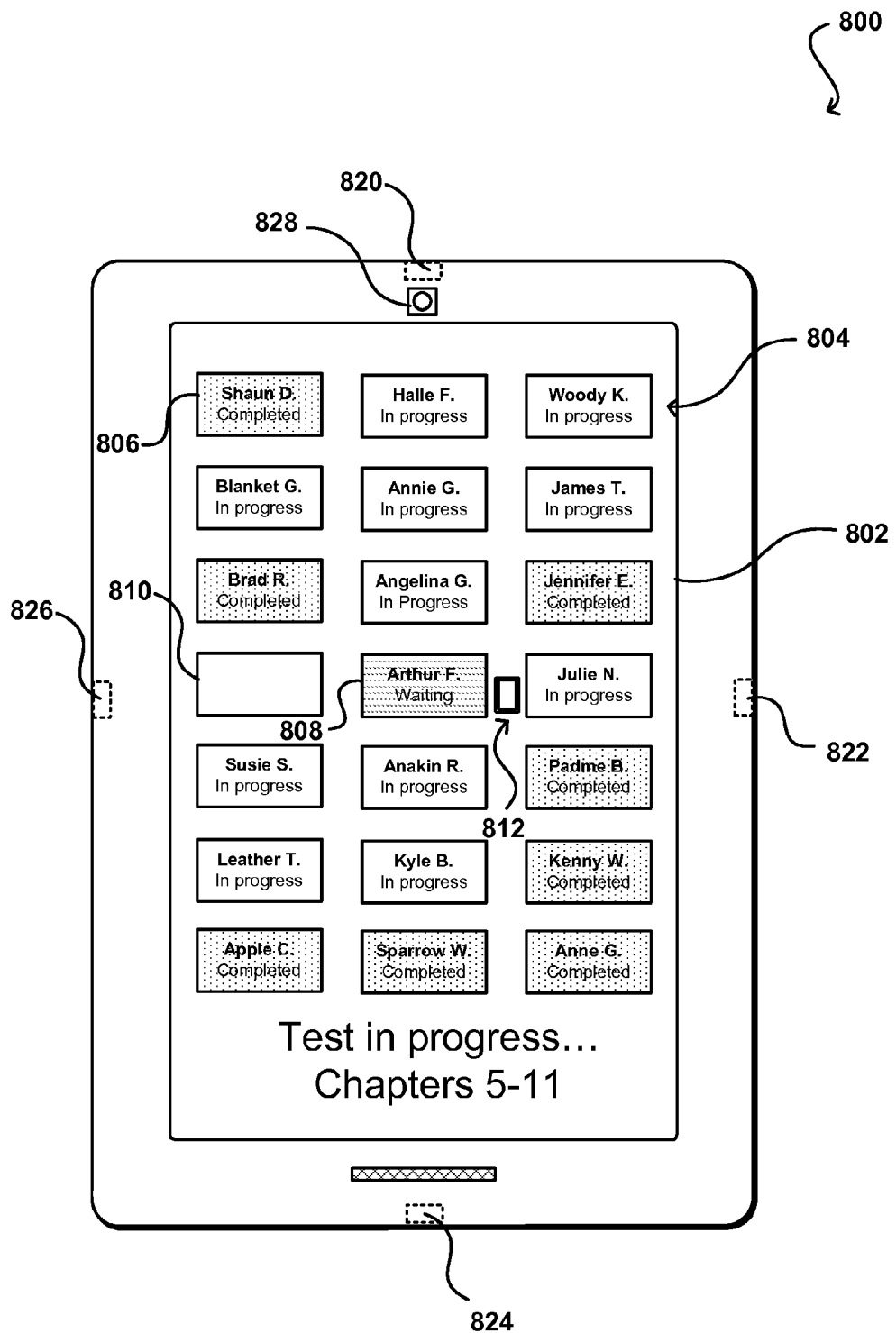
FIG. 8 illustrates an example interface display that can be used in accordance with various embodiments.

In addition to some of the functionality discussed above, additional uses and features of the client device may be advantageous for a variety of different users. FIG. 8 illustrates a client device 800 that includes five image capture elements 820, 822, 824, 826, 828 and a display screen 802. FIG. 8 illustrates an example use case whereby a teacher may operate the client device 800 in a classroom environment of students taking a specific test.

In this example, the teacher, before the test is administered to the students, may use the client device 800 to detect each student's computing device and/or a computing device corresponding to each desk location in the classroom. Using the FIG. 7(*a*) example, the image capture elements 820-828 may capture one or more images prior to administering the test. When at least a portion of a user and/or a computing device is located in a captured image, the client device 800 (or remote service) determines the location of the detected device, an ability to communicate with the detected device and identity information associated with the detected device. The identity information may allow the teacher to verify that correct students are attending class for the test.

FIG. 8 illustrates that an icon 804 can be displayed on a display screen 802 of the client device 800 representing each detected device. Each icon 804 may be displayed by the client device in the actual location of the student relative to the teacher or within the classroom. Identity information, such as the name of the student associated with the device, is displayed along with the icon 804 (e.g., Annie G., Jennifer E.). The client device 800 may transmit the test data to each of the devices using any communication protocol known in the art today. The client device 800 may also obtain status information from each of the student's devices. For example, a student's device that has not yet received the test may be represented by a certain icon or icon state 808.

When the teacher is ready to begin the test, the teacher can issue a command via the client device 800 that can cause the test or defined version of the test to be distributed/sent to the students and to begin the test on each device. The student's devices can periodically deliver test status information back to the client device 800 such that the test status is displayed. In one example, as shown in FIG. 8, the client device is reporting that several of the students are "in progress" of taking the test while some of the students have already "completed" the test. In addition to this type of status information displayed along with an icon, an icon may be visibly distinct based on the test status (e.g., a completed icon is visibly different than a waiting icon, etc.). When a student completes the test, a signal can be transmitted from the student's device to the client device 800, and a new icon or icon state 806 can be displayed showing that the student has completed the test. When all the students have completed the test, the teacher can collect all the test data (if not already collected) and close out the test. The teacher can also send a message to one or more selected students.

The client device 800 can also help the teacher with various other tasks. For example, a teacher can take attendance of her students using the client device. If a student is absent, the student's device will not be detected by the client device, and an icon 810 can be displayed on screen 802 indicating to the teacher that the student is missing from class. The client device 800 (or remote service) may also identify the information that was covered in class that the absent student missed. Then, at a later time, any information that the student missed can be transmitted to that student's device by the client device (or a remote service). FIG. 8 illustrates that the client device 800 may also display an icon 812 representing the current location of the client device itself (e.g., the teacher is walking up and down the rows of desks to monitor the students).

The ability for a user of the client device to move around while still monitoring other devices can be provided in a number of different ways. In a first approach, the captured image information for each of the devices can be analyzed to determine the relative change in position. In many cases, however, it can be difficult to determine whether the change in location is due to movement of the client device, movement of the detected device(s) or a combination of both. In some embodiments, the client device can include image analysis software that monitors/tracks differences in background portions of the captured image to determine movement of the client device. As mentioned with respect to FIGS. 1-2, certain client devices can include orientation or movement-determining elements such as accelerometers or gyro elements. These elements can detect motion of the client device, and can help to determine whether the relative movement of a detected device is due to movement of the detected device or movement of the client device. For example, in FIG. 8 where the user devices will remain primarily stationary at the student's desk location, the client device can determine that the changes in relative position are due to movement of the client device and can update the displayed locations accordingly.

Figure 9A:
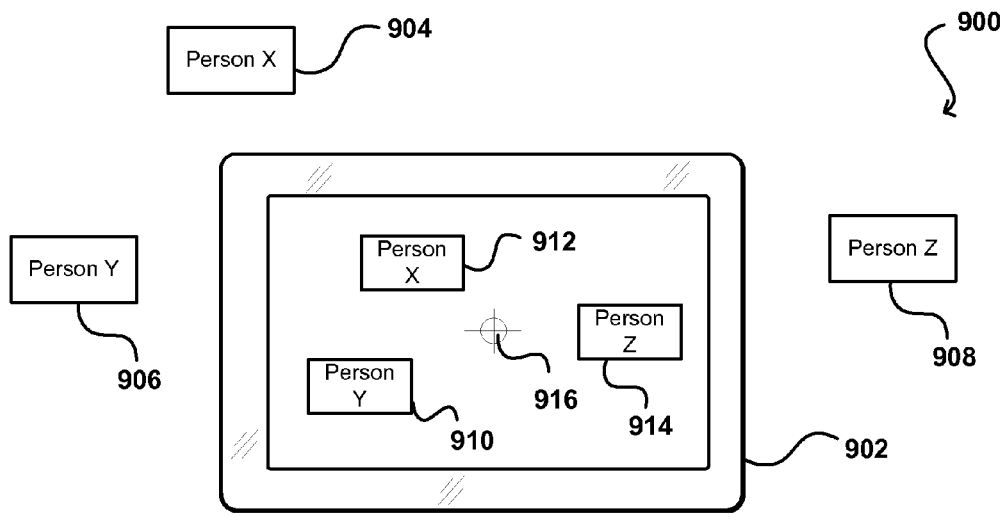
FIGS. 9(a)-9(b) illustrate an example of a portable device tracking movement of a detected device that can be used in accordance with one embodiment.
Figure 9B:
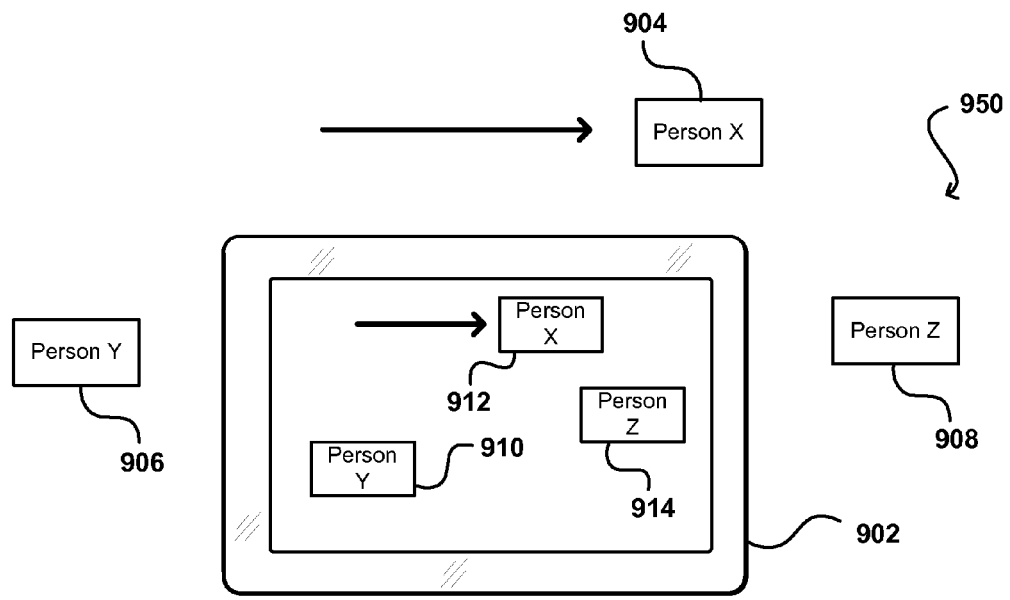

It can be desirable to update the locations of nearby devices relative to the client device. FIG. 9(*a*) illustrates an example arrangement 900 wherein three different user devices 904 (associated with Person X), 906 (associated with Person Y), 908 (associated with Person Z) are located nearby the client device 902. The location of each device is presented by the client device 902 relative to the location of the client device itself (shown as icon 916). Using the arrangement 900 shown in FIG. 9(*a*), icons 910, 912, 914 are displayed by the client device 902. Each icon 910, 912, 914 represents the location of the user device 906, 904, 908, respectively, relative to the client device 902.

The client device 902 can detect and display the motion of another device. For example, as shown in FIG. 9(*b*), the device 904 associated with Person X moves to a second location (as shown by the arrow in FIG. 9(*b*)). Tracking the position of the device 904 relative to the client device can be performed using any of a number of approaches discussed herein, such as to update the position based on the relative location imaged in subsequent images captured using at least one image capture element of the client device. In some cases, there can be an identifier (e.g., a bar code or symbol) on each device that assists with tracking the particular device in subsequent images captured by the client device, while in other embodiments, image recognition is performed to identify specific devices or users. In some embodiments, each device might send a periodic infrared signal, such as a heartbeat message, that indicates to the client device (and any other devices listening for those heartbeats) the current position of a specific device. Each heartbeat message can include any appropriate information, such as an identifier originally sent to the client device. Various other approaches can be used as well as discussed elsewhere herein. The detected movement of the device 904 can be displayed by the client device 902 by updating the location of the icon 912 representing the location of the device 904 relative to the client device 902. The motion of the icon 912 may be periodically updated in the display or shown in real-time.

The ability to track relative movement between devices can be used as input for a number of different applications other than those previously discussed. For example, FIGS. 10(*a*)-10(*b*) illustrate an example where the relative positions of the devices 1002 and 1004 can be used as input for a position-dependent aspect of an application, for example a game or similar application. In this example, a gaming application is executed on both client device 1002 and competitor device 1004. As discussed above, the devices can identify each other using infrared or a similar technology and track the location of the other device. Other communication approaches (e.g., Wi-Fi or Bluetooth) can be used for other aspects of the application as discussed elsewhere herein.

Figure 10A:
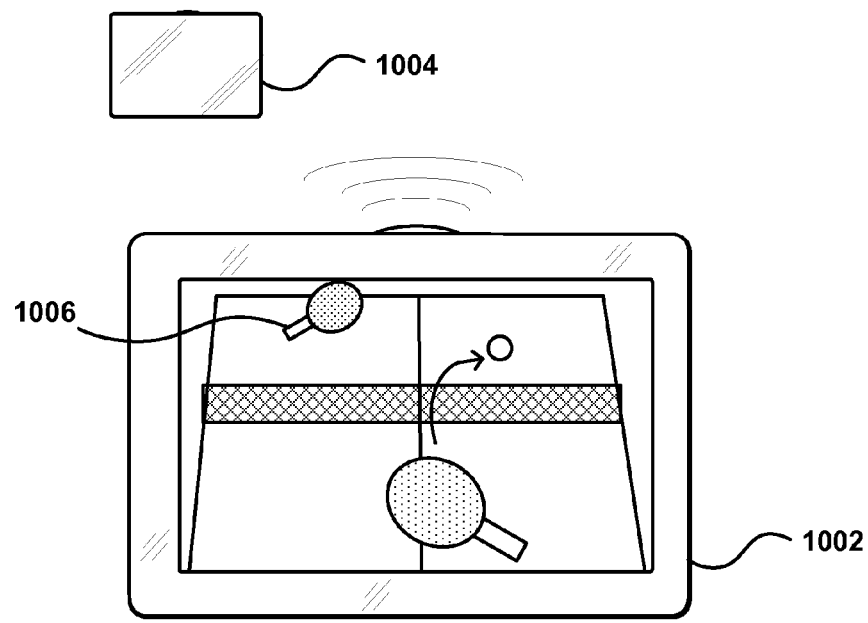
FIGS. 10(a)-10(b) illustrate a first approach to playing a multiplayer game that can be used in accordance with one embodiment.

FIG. 10(a) shows a player icon 1006 (e.g., paddle) displayed on the screen of the client device 1002 in substantially the location that the competitor device 1004 is relative to the client device 1002. In FIG. 10(a), the player using the client device 1002 (represented by the paddle in the foreground of the display) has hit the ball over the net. In order for the competing player (using the device 1004) to hit the ball back over the net, the competing player must move the device 1004 until the paddle icon 1006 is in a position to hit the ball back over the net.

Figure 10B:
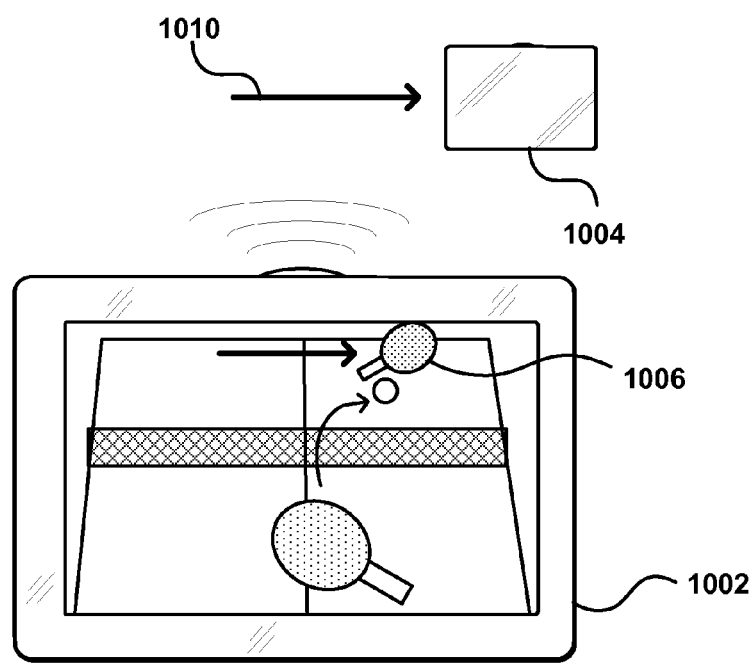

As illustrated by the arrow 1010 in FIG. 10(b), the competing player, in this instance, would have to move the device 1002 to the right (from the perspective of the player holding device 1002) to position the paddle 1006 in a position to hit the ball back over the net. Using this example of playing a game, the competing user can move the device 1004 in the appropriate direction until the location of the paddle 1006 is substantially in the position shown in FIG. 10(b) and then provide another input to hit the ball, such as press a button, interact with a touch screen or swing the competitor device 1004 in a motion representing hitting a ball.

Figure 11:
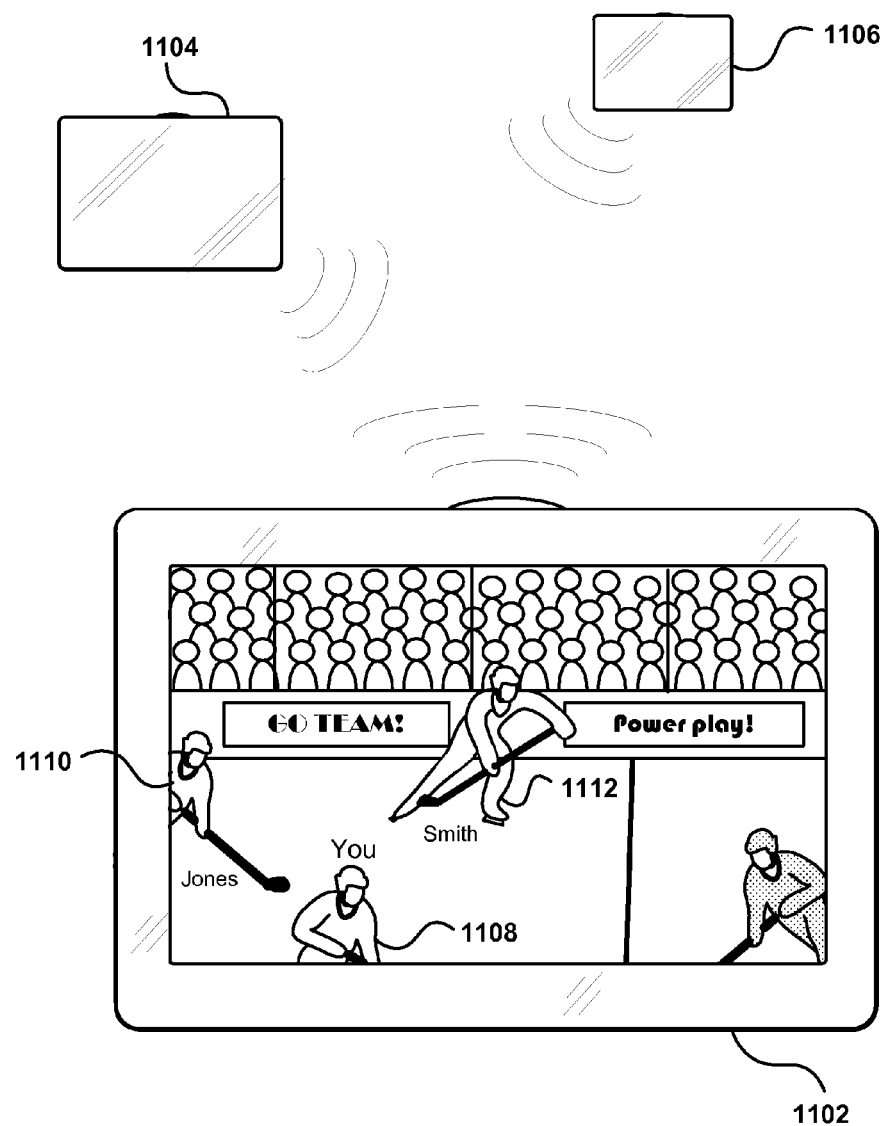
FIG. 11 illustrates a second approach to playing a multiplayer game that can be used in accordance with one embodiment.

FIG. 11 illustrates another use for displaying the location of another device relative to the client device. FIG. 11 illustrates that the location of each player in a hockey game is represented by the location of the user's device relative to another player's device. In this instance, three users are playing a multi-user hockey game whereby each user is using their own device to play the game. A first user is playing the game using device 1102, a second user is playing the game using device 1104 and a third user is playing the game using device 1106. Using the example shown in FIG. 11, the first user is able to view the location of the second player using device 1104 (player icon 1110) and the third player using device 1106 (player icon 1112) relative to device 1102 (player icon 1108).

In the instance of playing a multi-player game (e.g., ping-pong, hockey), it may be useful to define the area or boundaries of the virtual playing field prior to the start of the game, such as the size of the ping-pong table or the size of the ice rink. Defining the boundaries of the playing area will help the players understand the potential area that might have to be traversed during the course of the game. For example, the two players participating in a game of virtual ping-pong may decide to create a virtual ping-pong table that is the size of a tennis court as opposed to the size of a conventional ping-pong table. There are several ways to predefine or determine the size of a playing area including, but not limited to, a global positioning system (GPS), a laser range finder, ultrasound and manually defining a playing boundary on the display of any device participating in the game.

An example of defining the boundaries of a virtual ping-pong table will be used to describe how the boundaries of the table could be defined, according to various embodiments. If the client device included a GPS, a user could walk to each corner of the imaginary ping-pong table and, in some embodiments, indicate each corner of the imaginary table in a "set boundary" mode of the client device. After defining each corner of the ping-pong table, the client device could transmit the coordinates of the boundaries of the virtual ping-pong table to the other player's device. In other embodiments, when the boundaries of a game playing field are limited by the size of a room or area, a user, using a GPS, could walk to each corner of the room and designate each corner's coordinates as a boundary. In yet other embodiments, a laser range finder (that is either part of the client device or a separate device) could determine the boundaries of a room and transmit the boundaries to each device participating in the game. In some embodiments, a client device could access the floor plan of the building the players are located within and allow the user to designate what portion of the floor plan (including the entire room) constitutes the boundaries for the game (e.g., size of the ping-pong table).

In the instance where the players are not located in the same room, each device could display the floor plan of the particular room that each player was going to play the game within, and that user could draw or designate what portion of the room would be the boundary. This would allow users to create larger or smaller boundaries for themselves. For example, a first user may want more exercise/challenge when playing virtual ping-pong and therefore designates a larger playing area requiring the player to cover more territory during the course of the game (e.g., sets width of his half of the ping-pong table as 10 ft wide). On the other hand, the second player in the game might designate a smaller width for her half of the virtual ping-pong table. Thus, the second player could more easily cover their half of the table. This may be especially useful when the two players are of different athletic abilities and/or age. For example, a father that wants to play virtual ping-pong with his ten year-old son may set the width of his half of the ping-pong table to twice the width of his son's half of the ping-pong table so that the game is easier for his son and more challenging for himself. Different size playing fields could also be accomplished using a GPS, laser range finder or ultrasound.

Using the example of the father and son playing a virtual game of ping-pong, suppose the father and son want to play the game in the backyard. In some embodiments, the father's device may automatically identify each of the game participants (himself and his son), log each participant into the game and configure the game. Once the game is configured, the father's device may transmit the game configuration information to his son's device. In other embodiments, each of the participants' devices (father and son's device) identifies the other person as a game participant, logs themselves into the game and configures the game. For example, while in a game "configuration" mode, in one embodiment, the father's device may detect that his son is present in the backyard, configure the game for a two-player mode, log each of them into the game and automatically define the boundaries of the virtual ping-pong table within the backyard. The game configuration information can then be transmitted to the son's device. The father's device may personalize the game experience for the father by, for example, identifying an avatar or icon associated with the father (and using that avatar/icon to represent him in the game), the father's high score (to infer skill level), his preference to use a left-handed control, etc. The son's device may personalize the game in a similar manner for the son. These personal attributes identified by a device are exemplary only and are not intended to limit the scope of the technology described herein.

Figure 12:
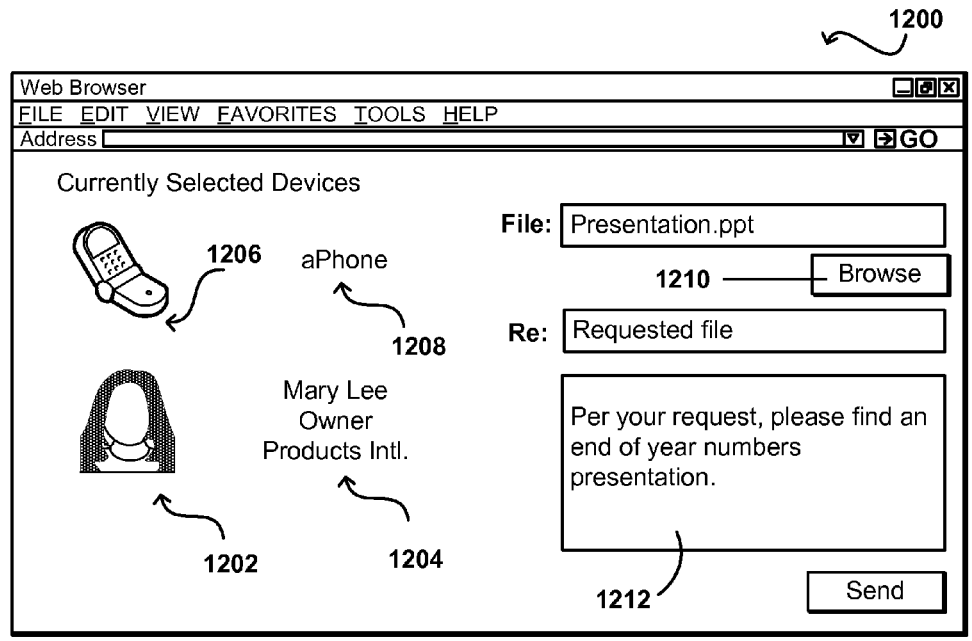
FIG. 12 illustrates an example interface enabling a user to send information to a detected device that can be used in accordance with one embodiment.

Returning to FIG. 4(c), the user of the client device can select one or more icons representing detected devices to receive information (e.g., a file) simply by selecting the appropriate icons displayed on the display of the client device. FIG. 12 illustrates an example information page 1200 that might be displayed on a client device in response to the selection of icons 466 and 468 shown in FIG. 4(c). The selected icons are displayed in the information page (e.g., user icon 1202 and device icon 1206) as well as the identity information associated with the icon (e.g., user information 1204 and device information 1208). The information display in the information page 1200 can help the user operating the client device ensure that information (e.g., Presentation.ppt) will be transmitted to the appropriate devices. The information page 1200 can also include any other appropriate features, such as a browse button 1210 used to select the file that will be sent to those selected devices, provide comments and/or instructions in a comment box 1212 or any other appropriate information. The file or information can be sent to another device using any appropriate communication technology and need not be transmitted using the approach that was used to determine the identity and/or location of the nearby devices.

Figure 13:
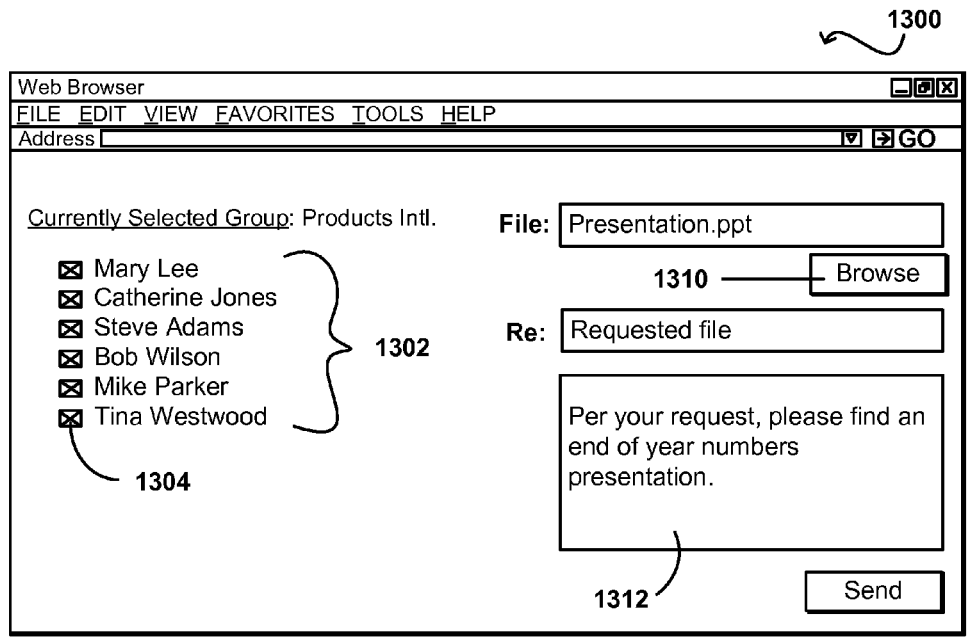
FIG. 13 illustrates another example interface enabling a user to send information to multiple detected devices that can be used in accordance with one embodiment.

In some embodiments, each item of identity information associated with a device and/or user may be selectable. This feature may be especially useful if, for example, a user would like to send information to all known persons associated with a particular group, company, etc. FIG. 13 illustrates an example of an information page 1300 that may be displayed upon selection of "Products Intl." in the identity information 467 displayed along with icon 466 shown in FIG. 4(*c*). Information page 1300 displays a group of persons 1302 associated with Products Intl.: Mary Lee, Catherine Jones, Steve Adams, Bob Wilson, Mike Parker and Tina Westwood. The group 1302 may consist of all persons in, by way of example only, the user's address book, contacts, social network, etc., all persons associated with a currently detected device or a combination thereof, that are associated with the company Products Intl. In the example shown in FIG. 13, a selection box 1304 is displayed along with each person in the group 1302. In some embodiments, the selection box 1304 for person displayed in the group 1302 is selected by default. In this instance, the user may browse available files using the browse button 1310, select the desired file (e.g., Presentation.ppt) and select the "send" button to send the "Presentation.ppt" file to each person in the group 1302. The user may also add comments in comments window 1312 that would be sent along with the selected file. In other embodiments, the selection box 1304 for each person displayed in the group 1302 is not automatically selected by default and the user must select the box 1304 for each person individually in order to send the "Presentation.ppt" file to the person.

Figure 14:
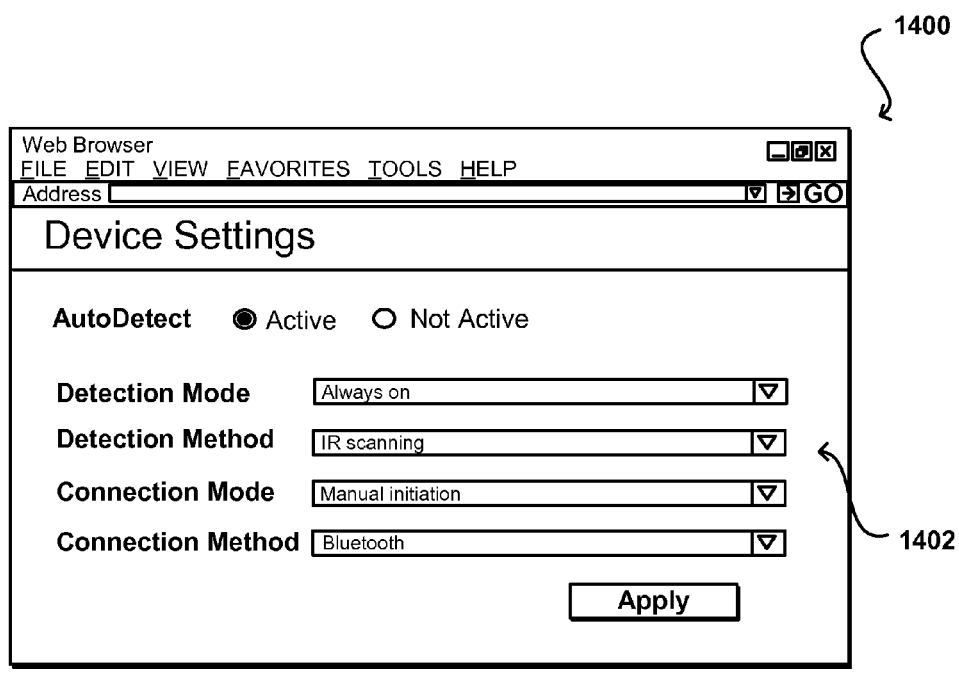
FIG. 14 illustrates an example interface page enabling a user to specify aspects of a device that can be used in accordance with one embodiment.

FIG. 14 illustrates an example interface page 1400 that enables a user of a client device to specify various aspects of the detection and communication processes of the client device. It should be understood that FIG. 14 merely includes a sample selection of configurable options 1402 for explanation purposes, and that a number of additional or alternative parameters or options could be utilized within the scope of the various embodiments. In this example, the user is able to activate or deactivate the automatic detection of nearby devices, as well as specify ways in which the device detects and/or connects with these nearby devices. In this example, the user has specified to have the client device always scanning for client devices using at least one infrared element of the client device. The user has also indicated that the client device should connect to these detected devices only when instructed by the user and that once detected and identified, the devices should communicate using Bluetooth® protocol. As should be understood, various options for each element can be provided as discussed or suggested elsewhere herein.

Figure 15:
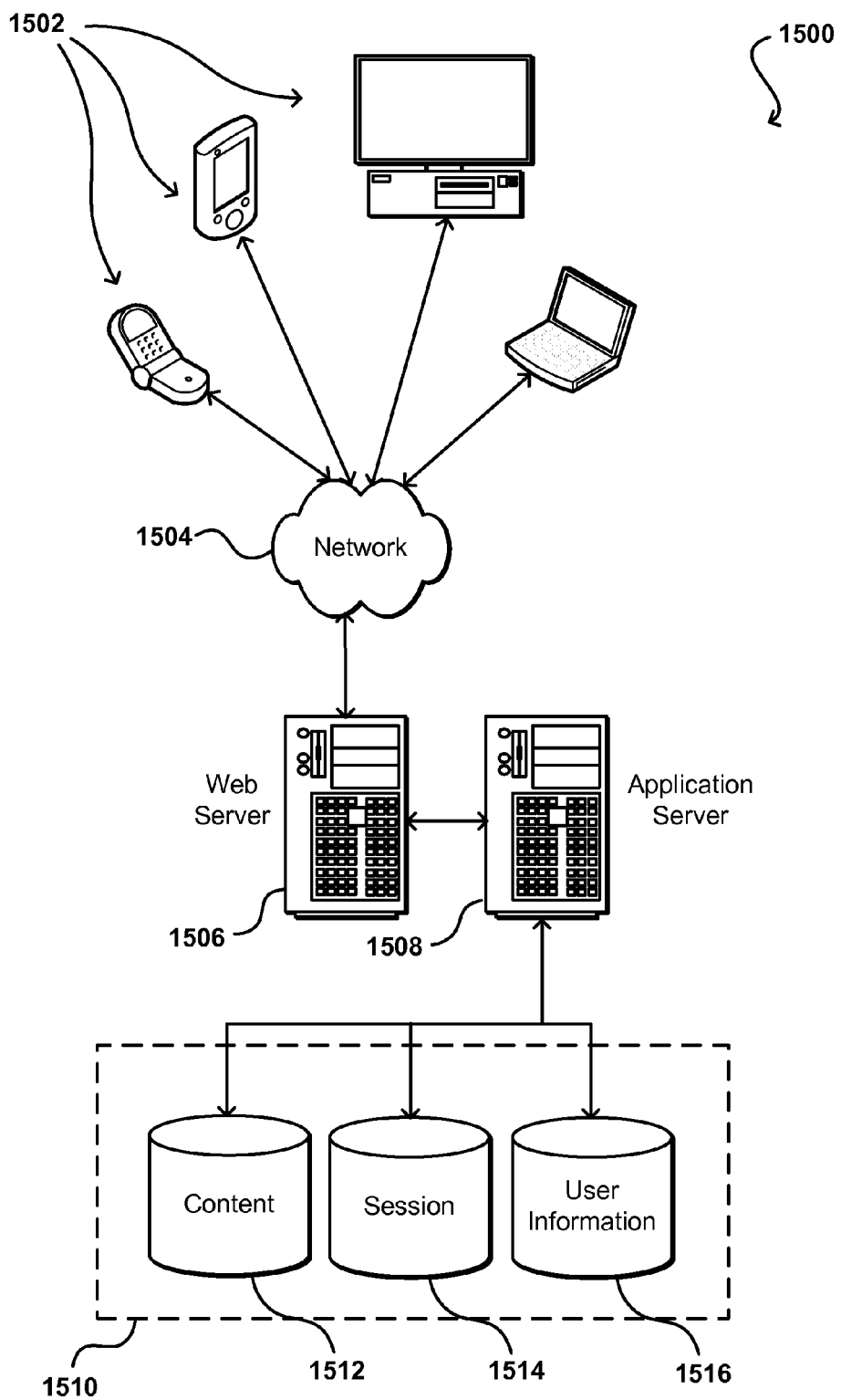
FIG. 15 illustrates an example environment in which various embodiments can be implemented.

In accordance with the various embodiments discussed above, various environments and technologies can be utilized as appropriate or desirable for various applications. For example, FIG. 15 illustrates an example of an environment 1500 for implementing aspects in accordance with various embodiments. As will be appreciated, although a Web-based environment is used for purposes of explanation, different environments may be used, as appropriate, to implement various embodiments. The environment 1500 shown includes a variety of client devices 1502, which can include any appropriate device operable to send and receive requests, messages or information over an appropriate network 1504 and convey information back to a user of the device. As discussed, at least some of these devices can also include components enabling the devices to communicate directly with each other via wireless communication. Examples of such client devices include personal computers, cell phones, handheld messaging devices, laptop computers, set-top boxes, personal data assistants, electronic book readers and the like. Each client device can be capable of running at least one motion or orientation-controlled interface as discussed or suggested herein. In some cases, at least some functionality will be generated and/or managed on at least one client device. In other embodiments, at least some of the functionality or content will be generated and/or managed over at least one network 1504.

The network 1504 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a content provider system including at least one Web server 1506 for receiving requests from a client device 1502 and serving content in response thereto, although for other networks an alternative device serving a similar purpose could be used as would be apparent to one of ordinary skill in the art.

The provider system can also include at least one application server 1508 or other such server in communication with at least one data store 1510. It should be understood that there can be several application servers, layers and/or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. An application server can include any appropriate hardware and software for integrating with the data store as needed to execute aspects of one or more applications for the client device and handle a majority of the data access and business logic for an application. The application server provides access control services in cooperation with the data store and is able to generate content such as text, graphics, audio and/or video to be transferred to the user, which may be presented to the user by the Web server in the form of HTML, XML, or another appropriate structured language in this example. The handling of all requests and responses, as well as the delivery of content between the client device 1502 and an application server 1508, can be handled by the respective Web server 1506. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

Each data store can include several separate data tables, databases, or other data storage mechanisms and media for storing data relating to a particular aspect. For example, a content data store 1512 as illustrated includes content that might be accessed or shared by a user of a client device. The user data store 1516 includes identification data and/or security information useful for validating specific users or associating users with specific devices. A session data store 1514 can store any appropriate information for a session, such as which devices participated or were detected, what information was obtained for each device, etc. It should be understood that there can be many other aspects that may need to be stored in a data store, such as access rights information, which can be stored in any of the above listed mechanisms as appropriate or in additional mechanisms in the data store. Each data store is operable, through logic associated therewith, to receive instructions from a respective application server and obtain, update or otherwise process data in response thereto. In one example, a user might submit a search request for a certain type of content. In this case, the data store might access the user information to verify the identity of the user and can access the content information to obtain information about instances of that type of content. The information can then be returned to the user, such as in a message or on a Web page that the user is able to view via a browser on the client device 1502.

Each server will typically include an operating system that provides executable program instructions for the general administration and operation of that server and will typically include a computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected, via communication links, using one or more computer networks or direct connections. However, it will be appreciated by those of ordinary skill in the art that such a system could operate equally well in a system having fewer or a greater number of components than are illustrated in FIG. 15. Thus, the depiction of the system 1500 in FIG. 15 should be taken as being illustrative in nature and not limiting to the scope of the disclosure.

Various embodiments discussed or suggested herein can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response to requests from user devices, such as by executing one or more Web applications that may be implemented as one or more scripts or programs written in any programming language, such as Java®, C, C# or C++ or any scripting language, such as Pert, Python, or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium, representing remote, local, fixed and/or removable storage devices as well as storage media for temporarily, and/or more permanently, containing, storing, transmitting and retrieving computer-readable information. The system and various devices will also typically include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims. For example, even though the client device was described throughout as a portable electronic device, the technology described herein may also apply to a non-portable electronic device (e.g., desktop computer, game console).

What is claimed is:

1. A computer-implemented method, comprising:
under the control of one or more computer systems configured with executable instructions,
capturing, using at least one image capture element of a first device, a first image;
detecting a presence of at least a portion of a second device in the first captured image;
determining, from the first image, a location of the second device relative to the first device;
capturing, using the at least one image capture element of the first device, a second image;
identifying, from the second image, a change in the location of the second device with respect to the first device; and
updating the location of the second device relative to the first device, based at least in part upon the change in the location of the second device with respect to the first device as represented in the second image;
wherein the first device is configured to communicate data with the second device.

2. The computer-implemented method of claim 1, wherein the at least one image capture element is a camera.

3. The computer-implemented method of claim 1, further comprising:
establishing communication between the first and second devices; and
determining a communication protocol for communicating between the first and second devices.

4. The computer-implemented method of claim 3, wherein the communication protocol is determined using at least one of the identity information associated with the second device or the at least one captured image.

5. The computer-implemented method of claim 1, wherein the identity information associated with the second device includes at least one of a second device identifier, a user associated with the second device, or an ability to communicate with the second device.

6. The computer-implemented method of claim 1, further comprising:
providing a graphical element for display on a user interface of the first device, the graphical element representing the identity information associated with the second device and the determined location of the second device.

7. The computer-implemented method of claim 6, wherein the graphical element displayed in the user interface of the first device is selectable to initiate communication between the first device and the second device when the first device has an ability to communicate with the second device.

8. The computer-implemented method of claim 6, further comprising:
displaying a second graphical element representing a location of the first device on the display element.

9. A computing device, comprising:
a processor;
at least one image capture element;
a display element; and
a memory element including instructions that, when executed by the processor, cause the computing device to:
capture, using at least one capture element in communication with the computing device, at least one image;
detect a presence of at least a portion of a second device in the at least one captured image;
determine, from the at least one image, a location of the second device with respect to the computing device;
determine an ability to communicate between the computing device and second device;
capture, using the at least one image capture element of the first device, a second image;
identify, from the second image, a change in the location of the second device with respect to the first device; and
update the location of the second device relative to the computing device, based at least in part upon the change in the location of the second device with respect to the computing device as represented in the second image;
wherein the computing device is configured to communicate data with the second device.

10. The computing device of claim 9, wherein the instructions, when executed further, cause the computing device to:
display a second graphical element representing a location of the computing device on the display element.

11. The computing device of claim 9, wherein the identity information associated with the second device includes at least one of a second device identifier, a user associated with the second device and an ability to communicate with the second device.

12. The computing device of claim 9, wherein the computing device includes a housing, the at least one image capture device comprises a plurality of image capture devices operable to capture images from substantially any direction from the housing.

13. The computing device of claim 9, wherein the instructions, when executed further, cause the computing device to:
establish communication between the computing device and the second device; and
determine a communication protocol for communicating between the computing device and the second device.

14. The computing device of claim 13, wherein the communication protocol is determined using at least one of the identity information associated with the second device or the at least one captured image.

15. A computing device, comprising:
a processor;
a display element;
a first image capture element located in a first corner region of the computing device;

a second image capture element located in a second corner region of the computing device;

a memory element including instructions that, when executed by the processor, cause the computing device to:

capture, using at least one of the first image capture element or the second image capture element, a first image;

detect a presence of at least a portion of an object in the first image;

determine, from the first image, a location of the object with respect to the computing device;

capture, using the at least one image capture element of the first device, a second image;

identify, from the second image, a change in location of the object with respect to the computing device; and update the location of the object relative to the computing device, based at least in part upon the change in the location of the object with respect to the computing device as represented in the second image;

wherein the first device is configured to communicate data with the object in the first image.

16. The computing device of claim 15 wherein the first image capture element and the second image capture element are both located on a front surface of the computing device.

17. The computing device of claim 15 further comprising:

a third image capture element located in a third corner region of the computing device; and a fourth image capture element located in a fourth corner region of the computing device.

18. The computing device of claim 17 wherein each of the first image capture element, the second image capture element, the third image capture element, and the fourth image capture element are located on a front surface of the computing device and have respective fields of view directed away from the front surface of the computing device.

19. The computing device of claim 15 wherein at least one of the first image capture element is operable to capture images using ambient visible light and the second image capture element is operable to capture images using infrared radiation.

20. The computing device of claim 15 wherein the first image capture element has an angular field of view different from an angular field of view of the second image capture element.

21. The computing device of claim 15 wherein the object is another computing device.

22. The computing device of claim 15 wherein the object is a second computing device, and wherein the instructions that, when executed by the processor, further cause the computing device to:

determine an ability to communicate between the computing device and the second device;

display a graphical element on the display representing information associated with the second device, wherein the information associated with the second device includes at least one of the determined location of the second device and identity information associated with the second device.

\* \* \* \* \*